United States Patent
Spencer et al.

(10) Patent No.: US 10,722,832 B1
(45) Date of Patent: Jul. 28, 2020

(54) DUST REMOVAL SYSTEM

(71) Applicant: James Hardie Technology Limited, Dublin (IE)

(72) Inventors: Matthew Spencer, Palatine, IL (US); Sam LaBanco, Chicago, IL (US); Parth Bhatt, Chicago, IL (US); Zachary Carlins, Chicago, IL (US)

(73) Assignee: James Hardie Technology Limited, Dublin (IE)

( * ) Notice: Subject to any disclaimer, the term of this patent is extended or adjusted under 35 U.S.C. 154(b) by 218 days.

(21) Appl. No.: 15/881,523

(22) Filed: Jan. 26, 2018

Related U.S. Application Data

(60) Provisional application No. 62/451,475, filed on Jan. 27, 2017.

(51) Int. Cl.

| | |
|---|---|
| *B01D 39/06* | (2006.01) |
| *B01D 50/00* | (2006.01) |
| *B01D 45/16* | (2006.01) |
| *B01D 39/12* | (2006.01) |
| *A47L 9/16* | (2006.01) |
| *B08B 17/02* | (2006.01) |
| *A47L 7/00* | (2006.01) |
| *A47L 5/02* | (2006.01) |
| *B08B 5/04* | (2006.01) |

(52) U.S. Cl.
CPC .............. *B01D 50/002* (2013.01); *A47L 5/02* (2013.01); *A47L 7/0095* (2013.01); *A47L 9/1608* (2013.01); *B01D 39/12* (2013.01); *B01D 45/16* (2013.01); *B08B 5/04* (2013.01); *B08B 17/02* (2013.01)

(58) Field of Classification Search
CPC ...... B01D 50/002; B01D 45/16; B01D 39/12; A47L 5/02; A47L 9/1608; A47L 7/0095; B08B 17/02; B08B 5/04
See application file for complete search history.

(56) References Cited

U.S. PATENT DOCUMENTS

| | | | | |
|---|---|---|---|---|
| 2,372,514 | A * | 3/1945 | Pootjes | B04C 5/24 |
| | | | | 55/343 |
| 2,392,872 | A * | 1/1946 | Wolfe | B04C 5/26 |
| | | | | 55/345 |
| 2,553,175 | A * | 5/1951 | Davenport | B04C 5/24 |
| | | | | 55/343 |
| 3,320,727 | A * | 5/1967 | Farley | A47L 9/1683 |
| | | | | 55/337 |
| 3,877,902 | A * | 4/1975 | Eriksson | A47L 5/365 |
| | | | | 55/337 |
| 3,955,236 | A * | 5/1976 | Mekelburg | E04D 15/07 |
| | | | | 15/314 |

(Continued)

*Primary Examiner* — Dung H Bui
(74) *Attorney, Agent, or Firm* — Knobbe Martens Olson & Bear, LLP

(57) ABSTRACT

A compact dust removal system that can be mounted on a substantially rigid receptacle, such as a pail, found at construction sites. The compact dust removal system includes an array of cyclonic separators of different sizes disposed within a mesh filter. The system can be mountable to a pail such that an initial dust removal stage occurs by inertial separation along the interior surface of the pail. The system further includes a cyclone inlet manifold configured to distribute dust-laden air among the cyclonic separators at least partially based on the size of dust particles within the dust-laden air.

17 Claims, 14 Drawing Sheets

(56) References Cited

U.S. PATENT DOCUMENTS

| | | | | |
|---|---|---|---|---|
| 4,326,862 A * | 4/1982 | Suzuki | B03C 3/15 | |
| | | | 123/198 D | |
| 6,471,751 B1 * | 10/2002 | Semanderes | B01D 45/12 | |
| | | | 55/300 | |
| 6,782,585 B1 * | 8/2004 | Conrad | A47L 5/225 | |
| | | | 15/351 | |
| 7,563,298 B2 * | 7/2009 | Oh | A47L 9/1633 | |
| | | | 15/350 | |
| 7,655,058 B2 * | 2/2010 | Smith | A47L 9/165 | |
| | | | 15/353 | |
| 7,879,142 B2 * | 2/2011 | Han | A47L 9/0081 | |
| | | | 15/352 | |
| 8,016,902 B2 * | 9/2011 | Makarov | A47L 5/365 | |
| | | | 15/352 | |
| 8,679,211 B1 * | 3/2014 | Makarov | A47L 9/1641 | |
| | | | 55/343 | |
| 8,728,186 B2 * | 5/2014 | Kim | A47L 9/1625 | |
| | | | 55/337 | |
| 9,198,551 B2 * | 12/2015 | Conrad | A47L 5/225 | |
| 9,204,771 B2 * | 12/2015 | Gammack | A47L 9/1633 | |
| 2005/0229780 A1 * | 10/2005 | Spink | B01D 46/003 | |
| | | | 95/65 | |
| 2006/0123590 A1 * | 6/2006 | Fester | A47L 9/122 | |
| | | | 15/353 | |
| 2006/0230716 A1 * | 10/2006 | Oh | A47L 9/1625 | |
| | | | 55/343 | |
| 2006/0230717 A1 * | 10/2006 | Oh | A47L 9/1625 | |
| | | | 55/343 | |
| 2006/0230718 A1 * | 10/2006 | Han | A47L 9/1608 | |
| | | | 55/345 | |
| 2007/0079587 A1 * | 4/2007 | Kim | A47L 9/1608 | |
| | | | 55/349 | |
| 2007/0209334 A1 * | 9/2007 | Conrad | A47L 5/28 | |
| | | | 55/337 | |
| 2007/0214754 A1 * | 9/2007 | Kim | A47L 9/1608 | |
| | | | 55/345 | |
| 2008/0172994 A1 * | 7/2008 | Courtney | A47L 9/1625 | |
| | | | 55/345 | |
| 2008/0184681 A1 * | 8/2008 | Oh | A47L 9/1625 | |
| | | | 55/345 | |
| 2008/0264017 A1 * | 10/2008 | Oh | A47L 9/1608 | |
| | | | 55/457 | |
| 2009/0100810 A1 * | 4/2009 | Smith | A47L 9/1625 | |
| | | | 55/343 | |
| 2010/0132155 A1 * | 6/2010 | Brough | A47L 9/122 | |
| | | | 15/352 | |
| 2010/0251506 A1 * | 10/2010 | Conrad | A47L 9/1683 | |
| | | | 15/344 | |
| 2010/0257826 A1 * | 10/2010 | Lin | B01D 45/14 | |
| | | | 55/337 | |
| 2010/0263163 A1 * | 10/2010 | Han | A47L 9/1608 | |
| | | | 15/353 | |
| 2012/0210537 A1 * | 8/2012 | Makarov | A47L 9/1608 | |
| | | | 15/353 | |
| 2013/0091815 A1 * | 4/2013 | Smith | A47L 9/102 | |
| | | | 55/346 | |
| 2014/0059983 A1 * | 3/2014 | Ho | B01D 45/16 | |
| | | | 55/343 | |
| 2014/0082883 A1 * | 3/2014 | Tran | A47L 9/1633 | |
| | | | 15/353 | |
| 2014/0366495 A1 * | 12/2014 | Stickney | A47L 9/127 | |
| | | | 55/343 | |
| 2015/0257616 A1 * | 9/2015 | Bassett | A47L 9/1608 | |
| | | | 15/353 | |
| 2016/0106282 A1 * | 4/2016 | Cho | A47L 9/12 | |
| | | | 55/327 | |
| 2016/0113466 A1 * | 4/2016 | Box | A47L 9/22 | |
| | | | 15/353 | |
| 2016/0150929 A1 * | 6/2016 | Shin | A47L 9/108 | |
| | | | 55/322 | |
| 2016/0206167 A1 * | 7/2016 | Kim | A47L 9/108 | |
| 2017/0156559 A1 * | 6/2017 | Krebs | A47L 9/1625 | |
| 2017/0303759 A1 * | 10/2017 | Conrad | A47L 5/30 | |

\* cited by examiner

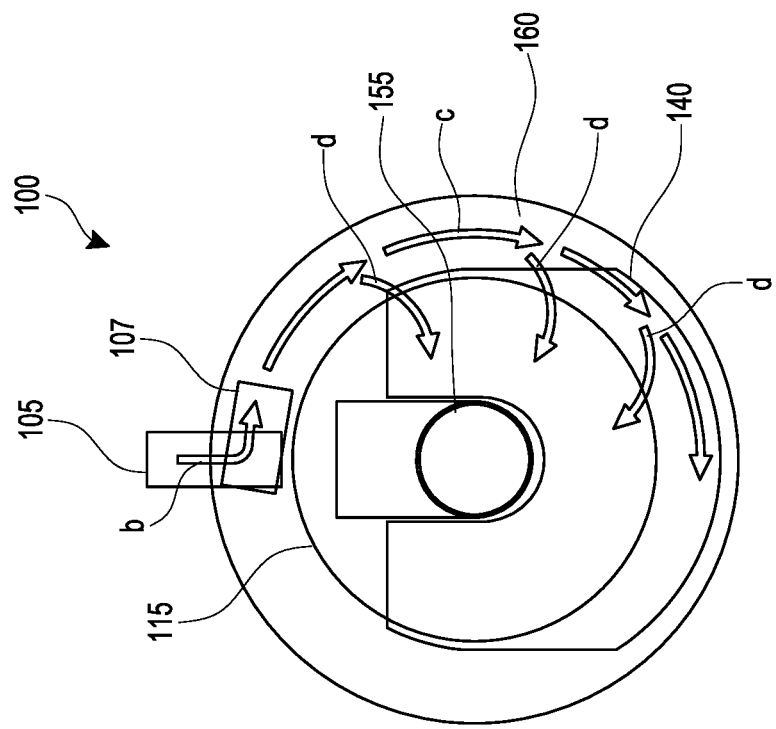
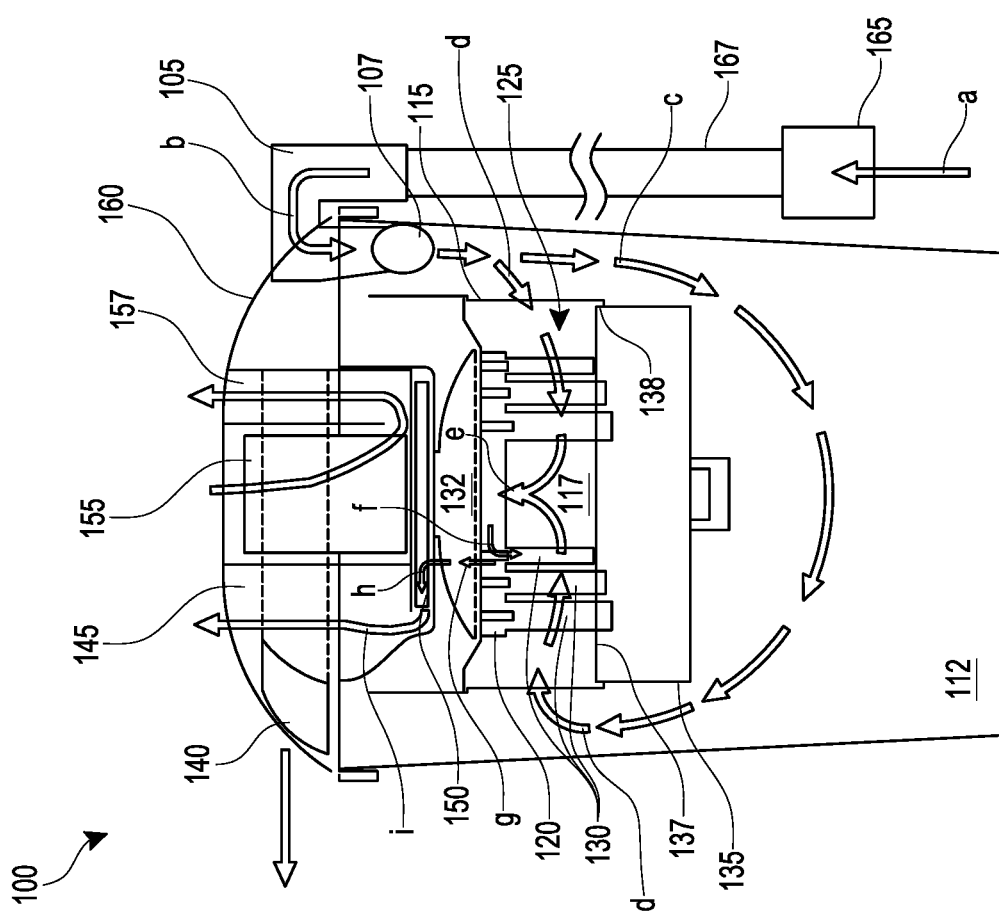
FIG. 1E
FIG. 1D

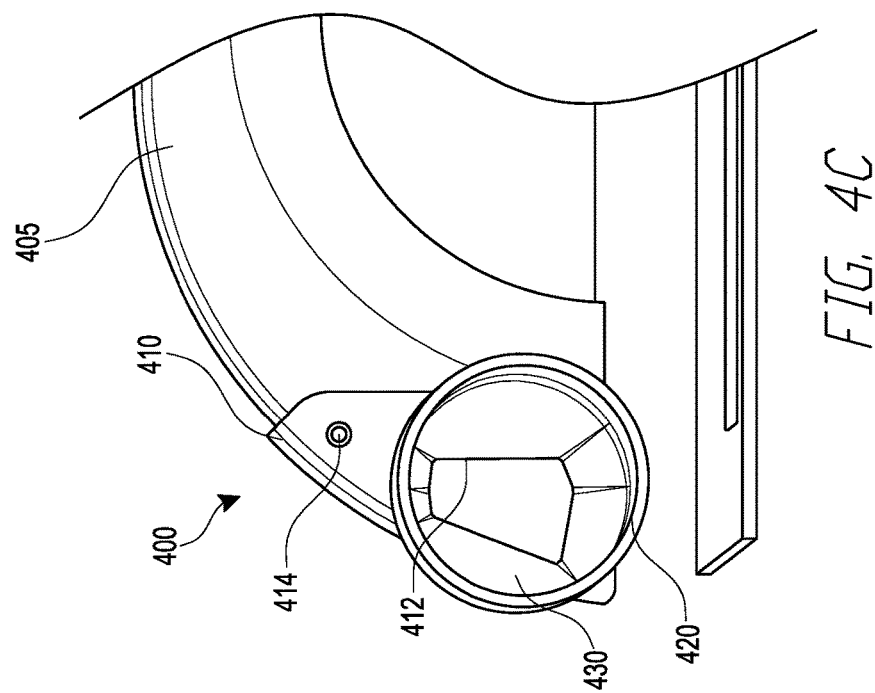
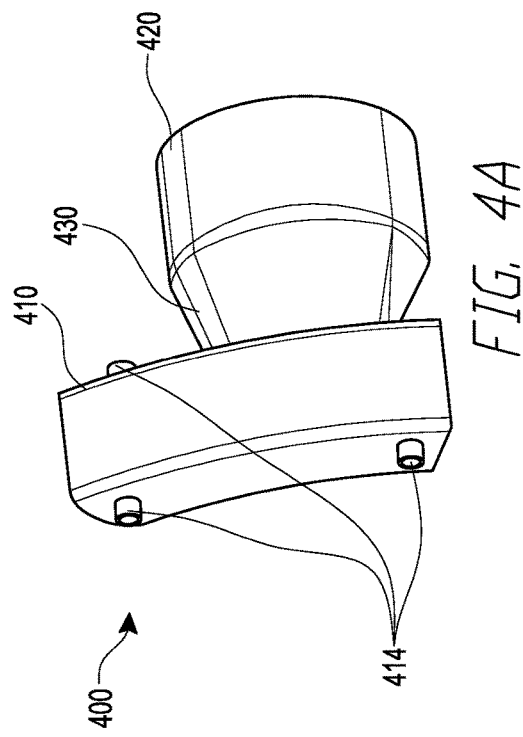
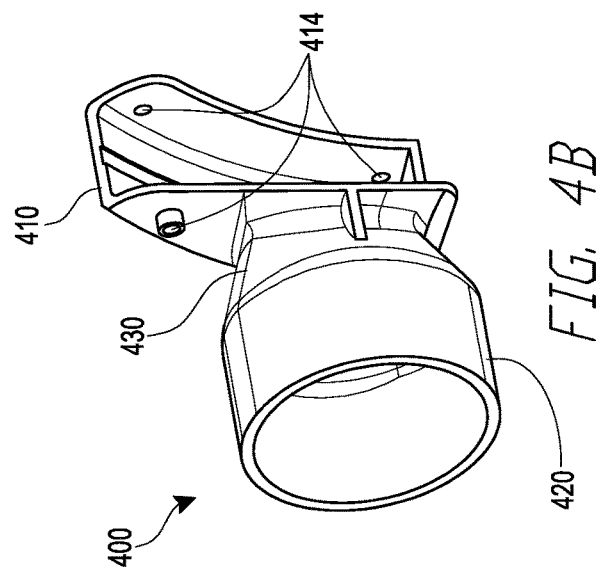

DUST REMOVAL SYSTEM

CROSS-REFERENCE TO RELATED APPLICATIONS

This application claims the benefit of U.S. Provisional Application Ser. No. 62/451,475, filed Jan. 27, 2017, entitled "DUST REMOVAL SYSTEM," which is hereby incorporated by reference in its entirety and for all purposes.

BACKGROUND

Field

The present disclosure generally relates to the field of construction, and more specifically to systems and methods for dust management.

Description of the Related Art

Building materials, such as siding, cladding, or other materials, are available in numerous product configurations. However, individual building projects such as construction or renovation frequently require such materials to be cut to specific lengths, widths, sizes, and/or shapes, other than those commercially or locally available, by an installer at a job site during installation. Building materials may be cut using tools such as electrically powered saws (e.g., table saws, circular saws, etc.) or the like. Many such materials, such as fiber cement and vinyl siding or cladding materials, may produce dust of various particle sizes when cut. The presence of dust from cutting building materials may be unpleasant, untidy, or otherwise undesirable.

Existing methods of mitigating job site dust from cutting building materials may include vacuum products, such as a wet/dry vacuum or "shop vacuum." However, wet/dry vacuum cleaners can have a number of disadvantages for dealing with construction site dust. For example, many wet/dry vacuums are not capable of meeting current safety requirements for dust exposure, e.g., OSHA requirements, when cutting materials such as fiber cement. In addition, a wet/dry vacuum can be large, heavy, and inconvenient to transport to a job site, and may take up an undesirably large amount of space within a transport vehicle. Further, existing wet/dry vacuums typically use filters as a primary dust removal method, which can quickly become clogged with dust and may be unable to handle the large amount of dust generated at a job site where building materials are being cut and installed. Frequent removal, replacement, and/or cleaning of such filters can be burdensome and inefficient.

Any discussion of the prior art throughout the specification should in no way be considered as an admission that such prior art is widely known or forms part of the common general knowledge in the field.

SUMMARY

The systems, methods, and devices described herein address one or more problems as described above and associated with current dust removal systems in the construction industry. The systems, methods and devices described herein have innovative aspects, no single one of which is indispensable or solely responsible for their desirable attributes. Without limiting the scope of the claims, the summary below describes some of the advantageous features.

In one embodiment, a dust separation device is described. The dust separation device includes a housing configured to couple with and cover an upper rim of a substantially rigid receptacle to form an enclosed interior space within the receptacle, an inlet at least partially disposed within the housing and configured to receive dust-laden air from outside the interior space and direct the dust-laden air into the interior space, a cyclone array coupled to the housing and configured to remove dust from the dust-laden air, a mesh screen configured to remove at least a portion of dust particles from dust-laden air traveling from the inlet to the cyclone array, a pump configured to drive air through the dust removal system, and at least one air filter disposed within the housing, the air filter configured to receive air that has passed through at least one cyclonic separator of the cyclone array. The cyclone array includes a first cyclonic separator defined by a substantially conical shape having a circular cross section of a first maximum diameter, a second cyclonic separator defined by a substantially conical shape having a circular cross section of a second maximum diameter smaller than the first maximum diameter, and a manifold coupled to the first and second cyclonic separators. The manifold includes a manifold inlet configured to receive the dust-laden air from the interior space, a first air channel defining a curvilinear air flow path between the manifold inlet and the first cyclonic separator, and a second air channel diverging from the first air channel at a first branching point spaced between the manifold inlet and the first cyclonic separator, the second air channel defining a curvilinear air flow path between the first branching point and the second cyclonic separator, wherein the first air channel has a first radius of curvature at the first branching point, and the second air channel has a second radius of curvature at the first branching point, the second radius of curvature being smaller than the first radius of curvature. The dust removal device can be interchangeably coupled to a plurality of rigid receptacles.

In some embodiments, the inlet further comprises a tangential section, said tangential section configured to induce an initial cyclonic separation of dust by directing the dust-laden air toward an interior wall of the receptacle.

In some embodiments, the dust separation device further includes a dust collection chamber removably secured to the dust separation device and configured to receive dust separated from the dust-laden air at the cyclone array.

In some embodiments, the pump includes an impeller disposed downstream from the cyclone array.

In some embodiments, the mesh screen includes an array of openings having an area between 0.005 square inches and 0.02 square inches (between 0.032 square cm and 0.129 square cm).

In another embodiment, a dust removal system is described. The dust removal system includes a first separation stage configured to remove a first portion of dust particles from a volume of dust-laden air by inertial separation, a second separation stage including a plurality of cyclonic separators configured to remove a second portion of dust particles from the volume of dust-laden air, wherein the second portion of dust particles are relatively smaller than the particles of the first portion of dust particles from the volume of dust-laden air, and a third separation stage including an air filter configured to remove a third portion of dust particles from the volume of dust-laden air, wherein the third portion of dust particles are relatively smaller than the particles of the second portion of dust particles.

In some embodiments, the first separation stage includes an inner surface of a substantially rigid receptacle.

In some embodiments, the dust removal system further includes a pre-filtration stage between the first separation stage and the second separation stage.

In some embodiments, the pre-filtration stage includes a mesh screen, the mesh screen located within the dust removal system such that substantially all air traveling from the first separation stage to the second separation stage passes through the mesh screen.

In some embodiments, the pre-filtration stage, the second separation stage, and the third separation stage form a dust removal device removably coupleable to the first separation stage.

In some embodiments, each of the cyclonic separators has a circular cross section with a maximum diameter, and at least two of the cyclonic separators have different maximum diameters.

In some embodiments, the second separation stage is configured to distribute the dust-laden air among the cyclonic separators based at least in part on the size of dust particles within the dust-laden air.

In some embodiments, the dust removal system further includes a collection stage, the collection stage including a conduit in fluid communication with the first separation stage and a dust collector in fluid communication with the conduit, the dust collector coupleable to a dust-producing device to receive dust produced by the dust-producing device.

In another embodiment, a cyclone array for removing dust from dust-laden air is described. The cyclone array includes a first cyclonic separator defined by a substantially conical shape having a circular cross section of a first maximum diameter, a second cyclonic separator defined by a substantially conical shape having a circular cross section of a second maximum diameter, wherein the second maximum diameter is smaller than the first maximum diameter, and a manifold. The manifold includes an inlet configured to receive a flow of dust-laden air, a first air channel defining a curvilinear flow path between the inlet and the first cyclonic separator, and a second air channel diverging from the first air channel at a first branching point spaced between the inlet and the first cyclonic separator, the second air channel defining a curvilinear air flow path between the first branching point and the second cyclonic separator. The first air channel has a first radius of curvature at the first branching point and the second air channel has a second radius of curvature at the first branching point, the second radius of curvature being smaller than the first radius of curvature.

In some embodiments, a first dust removal path comprises the first and second air channels and the first and second cyclonic separators, and the cyclone array further includes a second dust removal path in parallel with the first dust removal path. The second dust removal path includes a third cyclonic separator defined by a substantially conical shape having a circular cross section of the first maximum diameter, and a fourth cyclonic separator defined by a substantially conical shape having a circular cross section of the second maximum diameter. The manifold further includes a third air channel defining a curvilinear air flow path between the inlet and the third cyclonic separator, such that the first air channel and the third air channel each receive a portion of the dust-laden air entering the manifold at the inlet, and a fourth air channel diverging from the third air channel at a second branching point spaced between the inlet and the third cyclonic separator, the fourth air channel defining a curvilinear air flow path between the second branching point and the fourth cyclonic separator. The third air channel has the first radius of curvature at the second branching point, and the fourth air channel has the second radius of curvature at the second branching point.

In some embodiments, the cyclone array further includes a cyclone exhaust chamber disposed at an upper portion of the cyclone array, the cyclone exhaust chamber in fluid communication with the first cyclonic separator, the second cyclonic separator, and an impeller configured to cause air to flow through the cyclone array.

In some embodiments, the cyclone array further includes a dust collection chamber configured to receive particles removed from the dust-laden air within the first cyclonic separator and the second cyclonic separator.

BRIEF DESCRIPTION OF THE DRAWINGS

Certain embodiments of the present disclosure will now be described, by way of example only, with reference to the accompanying drawings. From figure to figure, the same or similar reference numerals are used to designate similar components of an illustrated embodiment.

FIG. 1D schematically depicts a side view of a dust removal system in accordance with an exemplary embodiment of the present disclosure.

FIG. 1E schematically depicts a top view of the dust removal system of FIG. 1D.

FIGS. 4A and 4B are perspective views of an example dust collector configured to collect dust generated by a circular saw.

FIG. 4C depicts the dust collector of FIGS. 4A and 4B coupled to a circular saw.

DETAILED DESCRIPTION

Figure 1A:
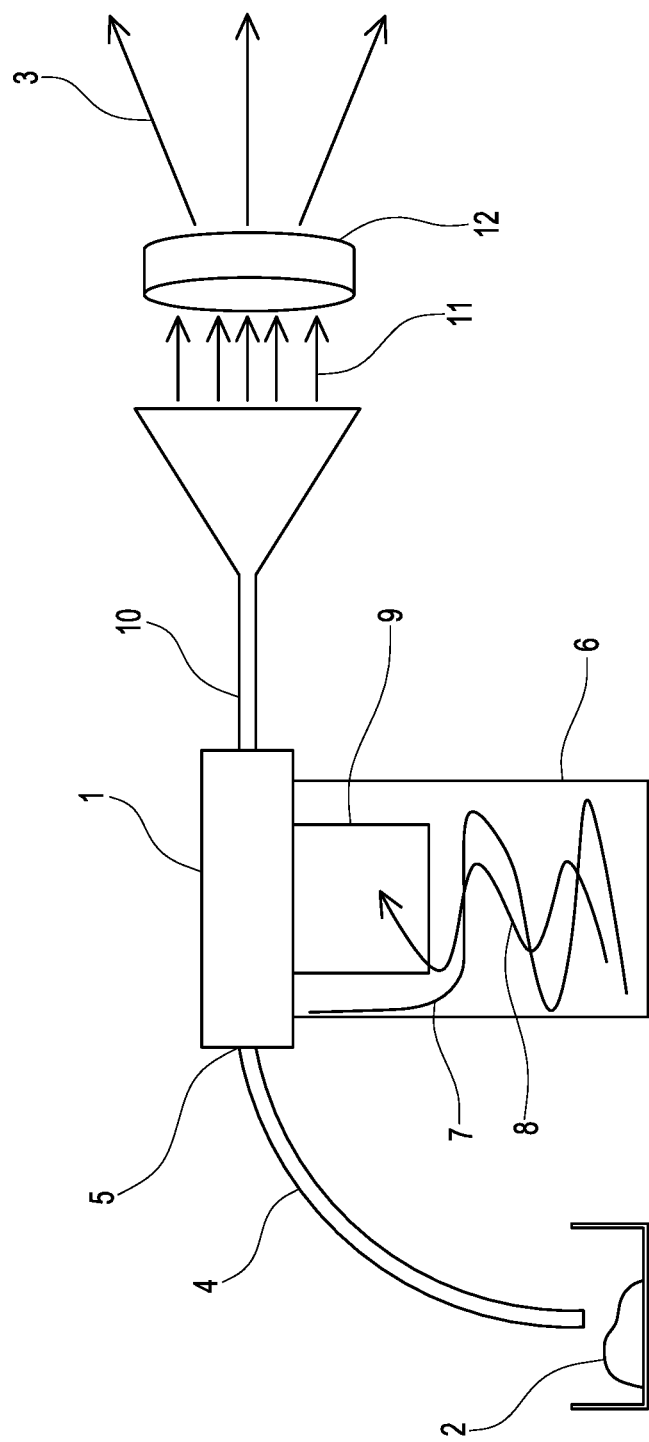
FIG. 1A schematically depicts the operation of a dust removal system in accordance with an exemplary embodiment of the present disclosure.

Although the present disclosure is described with reference to specific examples, it will be appreciated by those skilled in the art that the present disclosure may be embodied in many other forms. The embodiments discussed herein are merely illustrative and do not limit the scope of the present disclosure.

In the description which follows, like parts may be marked throughout the specification and drawings with the same reference numerals. The drawing figures are not necessarily to scale and certain features may be shown exaggerated in scale or in somewhat generalized or schematic form in the interest of clarity and conciseness.

Generally described, and with reference to FIG. 1A, a dust removal system 1 in accordance with an example embodiment of the present disclosure is configured to efficiently remove dust from dust-laden air. In the embodiment schematically depicted in FIG. 1A, the dust removal system 1 receives a quantity of dust 2 contained within a flow of dust-laden air. The dust removal system 1 processes the dust-laden air to remove the dust and outputs cleaned air 3. In some aspects, the cleaned air 3 can be substantially free of dust, may contain significantly less dust than the received dust-laden air, and/or may at least be substantially free of dust particles greater than a maximum or threshold particle size.

Dust-laden air may include dust particles having a variety of sizes. For example, as compared to an average particle size or a median particle size of the particles within a volume of dust-laden air, a portion of the particles may be relatively larger, a portion of the particles may be relatively smaller, and a portion may be similar in size to the average or median particle size. The mass of a dust particle may be generally proportional to the particle size. As will be described in greater below, efficiency of removing particles from dust-laden air may be enhanced by incremental removal of portions of the particles from the dust-laden air in a plurality of dust removal stages. For example, relatively larger and heavier particles may be removed first, followed by medium-sized particles, followed by relatively smaller and lighter particles. In some embodiments, several different particle removal, separation, and/or filtration structures may be provided within a dust removal system, each structure being adapted to remove a subrange of particle sizes from dust-laden air.

The dust removal system 1 receives the air containing dust 2 via a conduit 4 or other receiving structure. The dust-laden air travels through the conduit 4 and enters the dust removal portion of the dust removal system 1 at an inlet 5. At inlet 5, the dust-laden air passes into the interior of an exterior vessel 6. Within the exterior vessel 6, the dust-laden air travels along a descending helical path 7 guided by the interior surface of the exterior vessel 6. The air then travels in an ascending helical path 8 toward a cyclone assembly 9 of the dust removal system 1. A portion of the dust 2 carried within the dust-laden air is removed by cyclonic, inertial, and/or centrifugal separation as the air travels along helical paths 7 and 8. Typically, the portion of dust 2 removed in this initial cyclonic separation stage includes the dust particles of relatively large size and mass as compared to the average size of the particles of dust 2.

At the cyclone assembly 9, additional particles of dust 2 are removed from the dust-laden air by a combination of filtering, such as by a screen or mesh, and cyclonic separation in a series of cyclonic separators. The structure, function, and components of the cyclone assembly 9 are described in greater detail below. After additional dust removal at the cyclone assembly 9, a cyclone exhaust 10 guides the relatively cleaner air 11 to a final filtration stage 12. The final filtration stage 12 removes at least a portion of the dust 2 remaining in the relatively cleaner air 11, and cleaned air 3 passes out of the system.

Air can be propelled through the dust removal system 1 by an impeller or other centrifugal pump disposed within the system 1 at a point along the air flow path. For example, an impeller can be located at a point along the cyclone exhaust 10. Thus, as the impeller or other centrifugal pump turns, a negative pressure is generated at the upstream side of the pump (e.g., along the air flow path toward the inlet 5 and conduit 4), and a positive pressure is generated at the downstream side of the pump (e.g., toward the exhaust 10 and filter 12). The negative pressure on the upstream side of the pump draws air and the associated dust 2 through the various upstream parts of the dust removal system 1 to the impeller, while the positive pressure on the downstream side of the pump propels the relatively cleaner air 11 through the exhaust 10 and final filtration stage 12, and out of the system 1.

Figures 1B, 1C:
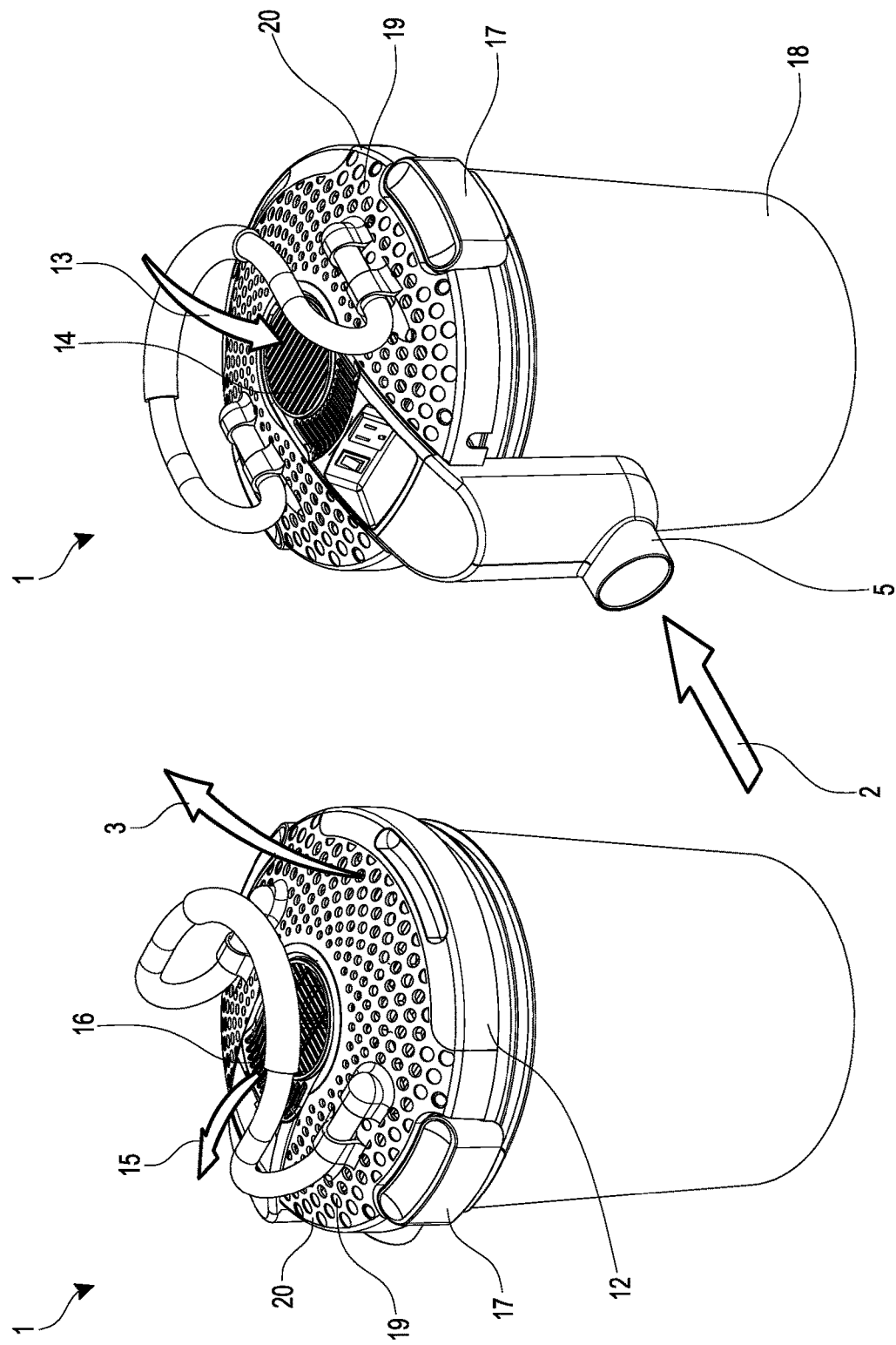
FIGS. 1B and 1C are perspective views further depicting the operation of an example dust removal system.

FIGS. 1B and 1C depict an example structural embodiment and general function of the dust removal system 1 described above. The dust removal system 1 includes an upper housing 20 removably coupled to an exterior vessel 18 by one or more securing mechanisms such as clasps 17. When in operation, the dust removal system 1 receives dust-laden air 2 at an inlet 5, and outputs cleaned air 3 at a cleaned air outlet 19 (e.g., a series of apertures in the upper housing 20). A final filtration section 12 is located within the upper housing 20 below the cleaned air outlet 19 to filter relatively cleaner air as it travels to the outlet 19.

The impeller disposed within the dust removal system 1 is generally powered by a motor, which can be disposed within the upper housing 20 as will be described with reference to FIGS. 1D and 1E. A flow of motor cooling air 13 can be drawn into the dust removal system 1 from the exterior at a motor cooling intake 14. The motor cooling air 13 transfers heat from the operating motor and leaves the upper housing 20 as motor exhaust air 15 at the motor cooling exhaust 16.

With reference to FIGS. 1D and 1E, additional components and operation of an example embodiment of a dust removal system will be described. FIGS. 1D and 1E schematically depict an example dust removal system 100. As described above with reference to FIGS. 1A-1C, the dust removal system 100 includes an inlet 105, an exterior vessel 110, a pre-filtration section 115, and an upper housing 160 including one or more filters 140, a filtered air exhaust 145, an impeller 150, and a motor 155. Within the pre-filtration section 115, a cyclone assembly is disposed, including a cyclone inlet manifold 120, an array 125 of cyclonic separators 130, and a dust collection chamber 135. The inlet 105 includes a tangential section 107. In various embodiments, the inlet 105 can further be in communication with an air or dust collector 165 via a conduit 167.

The exterior vessel 110 can be a solid container configured to support the other components of the dust removal system. The exterior vessel 110 can be a substantially cylindrical container or any other container having a substantially circular cross section, such as a bucket, a pail, or the like. In some embodiments, the exterior vessel 110 can be a non-cylindrical container, such as a commercially available pail having a tapered shape as shown in FIG. 1D. In some embodiments, the inlet 105, pre-filtration section 115, cyclone inlet manifold 120, array 125 of cyclonic separators 130, dust collection chamber 135, filters 140, filtered air exhaust 145, impeller 150, motor 155, and upper housing 160 are a preassembled unit configured to be coupled to an exterior vessel 110 for use. In one example, the upper housing 160 is sized and shaped to accommodate, rest upon and removably attach to the upper rim of a five-gallon bucket or pail commonly used at construction or manufacturing sites. Thus, the dust removal system 100 can be conveniently stored and/or transported without an exterior vessel 110 and conveniently coupled to a conventional bucket or pail when used.

Dust-laden air to be cleaned by the dust removal system 100 can be received from the collector 165 via a conduit 167. The dust-laden air enters the collector 165 and conduit 167 along flow path a. The dust-laden air can be sucked or drawn into the dust removal system 100 by a negative pressure within the system 100 created by the turning of the impeller 150. The conduit 167 can be, for example, a flexible hose having a substantially circular cross section. The collector 165 can be any structure capable of receiving dust laden air from the environment. In one embodiment, the collector 165 is a circular opening at the end of the conduit 167. In another embodiment, the collector 165 is an adaptor configured to efficiently remove dust generated by an electrically powered saw or other dust-generating tool. Collectors configured to couple with and extract dust-laden air from a dust-generating tool are discussed in greater detail with reference to FIGS. 4A-5C.

The inlet 105 is a conduit configured to permit air or any other fluid, as well as particles, dust, or debris carried within the fluid, to flow through the upper housing 160 to a space 112 at least partially enclosed by the exterior vessel 110. The fluid may be dust-laden air. The tangential section 107 of the inlet 105 is oriented such that air flowing into the space 112 from the inlet 105 through the tangential section 107 is guided so as to travel along flow path b, in a direction substantially tangential to the circular or elliptical cross section of the exterior vessel 110, or in any other direction between tangential and radially outward, such that the dust-laden air travels directly toward a nearby interior surface of the exterior vessel 110. Within the exterior vessel 110, the dust-laden air travels generally downward and circumferentially along flow path c, which may be a helical path. As described in greater detail below, tangential flow of air entering the exterior vessel 110 can advantageously provide for inertial and/or cyclonic separation of at least a portion of the particles, dust, and/or debris from dust-laden air.

The pre-filtration section 115 includes a semipermeable material, such as a mesh, a screen, a web, or the like. In certain embodiments, the semipermeable material is a mesh having an array of openings, each opening having an area between approximately 0.005 square inches and 0.05 square inches. In one example, each opening has an area of approximately 0.0118 square inches. The pre-filtration section 115 at least partially surrounds the cyclone array 125 such that air being pulled from the space 112 in the exterior vessel 110 into a space 117 within the pre-filtration section 115 (e.g., by the negative pressure caused by the turning of the impeller 150) and to the cyclone array 125 passes along flow path d through the semipermeable material of the pre-filtration section 115.

The cyclone inlet manifold 120 includes an inlet configured to receive air and dust traveling along flow path e from the space 117 inside the initial separation and one or more air flow channels configured to direct air along flow path f from the inlet to the cyclonic separators 130. The cyclonic separators 130 can be oriented vertically or at an angle between 0° and 45° from vertical. Each cyclonic separator 130 has an upper outlet at the top of the separator 130 and a lower outlet at the bottom of the separator 130. The lower outlet allows dust particles to pass out of the bottom of the separator 130, while the upper outlet allows the somewhat cleaner air to pass out of the top of the separator 130 along flow path g. The cyclone inlet manifold 120, the array 125 of cyclonic separators 130, and the connections therebetween are discussed in greater detail below with reference to FIGS. 2E-3D.

The dust collection chamber 135 is a vessel disposed below the cyclone array 125 and configured to receive and retain dust, dirt, or other debris that exits the lower outlet of any of the cyclonic separators 130. The dust collection chamber 135 can be fixed to the bottom of the cyclone array 125, such as at a cyclone array base plate 137, by a mechanical fastener, a friction fit, or the like. The dust collection chamber 135 can be removable from the base plate 137 such that the collected contents of the dust collection chamber 135 (e.g., dust, dirt, or other debris removed from the air in the cyclonic separators 130) can be removed and the dust collection chamber 135 can be reattached to the base plate 137. In certain embodiments, the dust collection chamber 135 can be secured to the base plate 137 by one or more screw threads 138 so as to be removable and attachable by rotating the dust collection chamber 135. Thus, the dust collection chamber 135 can combine with the pre-filtration section 115 and the upper housing 160 to form a durable housing protecting the components located therein when the dust removal system 100 is not mounted to the exterior vessel 110 (e.g., for transportation, storage, or the like).

The impeller 150 is located within or below the upper housing 160 in fluid communication with a cyclone exhaust chamber 132 above the cyclone array 125. The motor 155 is mounted within and secured to the upper housing 160, and is further coupled to the impeller 150 such that actuation of the motor 155 causes the impeller 150 to turn, pulling air along flow path h through the impeller. The motor is controlled by a switch or other actuator. A motor exhaust 157 can further be included in the upper housing 160 to permit the circulation of air for cooling the motor 155 and preventing overheating.

The one or more filters 140 can be located within a space in the upper housing 160 along air flow path i between the impeller 150 and the exhaust 145. The one or more filters 140 can be removable from the upper housing 160, such as by sliding. Filters 140 can be any type of air filtration device, for example, a fibrous air filter or the like. In various embodiments, the filters 140 can have a minimum efficiency reporting value (MERV) rating selected based on a desired cleanness of the final filtered air released back into the environment. For example, the filters 140 can be a filter stack having a MERV rating of 12, 13, 14, or greater.

An exemplary method of operation of the dust removal system 100 will now be described. When the motor 155 is actuated, the motor 155 turns the impeller 150, propelling air from the cyclone exhaust chamber 132 above the cyclone array 125 along flow path h and out of the system 100 at the exhaust 145 along flow path i. The resultant negative pressure causes air to travel through the system 100 by entering the system 100 along flow path a at the collector 165 and traveling along flow paths a-g consecutively, through the conduit 167, the inlet 105, the space 112 in the exterior vessel 110, the pre-filtration section 115, the space 117 inside the pre-filtration section 115, the cyclone inlet manifold 120, and the cyclonic separators 130.

When air and dust from the collector enters the inlet 105, the air travels along flow path b through the tangential section 107 of the inlet 105 and enters the space 112 within exterior vessel 110. After leaving the tangential section 107 of the inlet 105 in a direction approximately perpendicular to the radius of the circular cross section of the exterior vessel 110, the air travels along flow path c, colliding with an interior surface of the exterior vessel 110 and/or changing direction to travel in a circular and/or helical path along the interior of the exterior vessel 110. The air and any particles of dust, dirt, and/or debris carried within the air are thus subjected to a centrifugal force within the non-inertial reference frame of the rotationally moving air stream. This centrifugal force can cause at least a portion of the dust, dirt, and/or debris to separate from the air stream, colliding with the interior surface of the exterior vessel 110 and falling to the bottom of the exterior vessel 110. Generally, the size and weight of the particles removed by cyclonic separation depends upon the diameter of the cyclonic separation container. Thus, the particles separated from the dust-laden air at this initial cyclonic separation stage are relatively large particles due to the relatively large diameter of the exterior vessel. Initial removal of relatively large particles may be advantageous as such large particles may tend to clog filters or other components of a dust removal system more quickly than relatively smaller particles.

After traveling some distance along the interior surface of the exterior vessel 110, the air and remaining dust, dirt, and/or debris travel along flow path d to an outer surface of the pre-filtration section 115. As described above, the pre-filtration section 115 can include mesh screen sections permitting dust-laden air to pass through to the space 117 inside the pre-filtration section 115. As the air passes along flow path d through the pre-filtration section 115, dust, dirt, or other particles larger than the size of the openings in the mesh are retained outside the pre-filtration section 115. Some or all of the removed particles may fall to the bottom of the exterior vessel 110.

Entering the space 117 inside the pre-filtration section 115, the air can travel along flow path e into the cyclone inlet manifold 120, which distributes the dust-laden air along flow path f to the various cyclonic separators 130 of the cyclone array 125. Within the cyclonic separators 130, additional dust and/or dirt is removed from the air stream by cyclonic separation. The cyclonic separation process occurring within the cyclonic separators 130 occurs similarly to the earlier centrifugal separation process within the exterior vessel 110. However, because the cyclonic separators 130 each have a diameter significantly smaller than the diameter of the exterior vessel 110, the cyclonic separators 130 can more efficiently remove dust and dirt particles smaller than those removed by centrifugal force in the exterior vessel 110.

As cyclonic separation occurs within the cyclonic separators 130, the removed dust and dirt falls through a lower outlet at the bottom of each separator 130 into the cyclone dust chamber 135. The cleaner air travels upward along flow path g through an upper outlet at the top of each separator 130 into the cyclone exhaust chamber 132 above the cyclone array 125. The air in the cyclone exhaust chamber 132, having undergone two stages of cyclonic dust removal and passed through a mesh or screen in the pre-filtration section 115, now contains significantly less dust or other particulate matter than when it entered at the inlet 105. The impeller 150 sends the air along flow paths h and i through the filters 140 for a final dust removal stage before the air leaves the system 100 at the exhaust 145.

Thus, embodiments of the dust removal system 100 may achieve high filtration efficiency and durability by utilizing the process described above. For example, utilizing a first separation stage, including the initial centrifugal separation at the interior surface of the exterior vessel 110 and mesh filtration at the pre-filtration section 115, allows the system 100 to remove the largest particles from dust-laden air before the dust-laden air reaches the cyclone array 125. The cyclonic separators 130 in the primary separation stage, or second separation stage, can thus be sized smaller to effectively remove relatively smaller dust particles without suffering decreased flow rate or clogs due to the presence of large particles. In addition, the first and second separation stages can advantageously remove much of the dust from the dust-laden air such that relatively fine air filters 140 may be employed in the third separation stage at the end of the dust removal cycle without becoming quickly clogged with dust or other particulate matter.

Figure 2A:
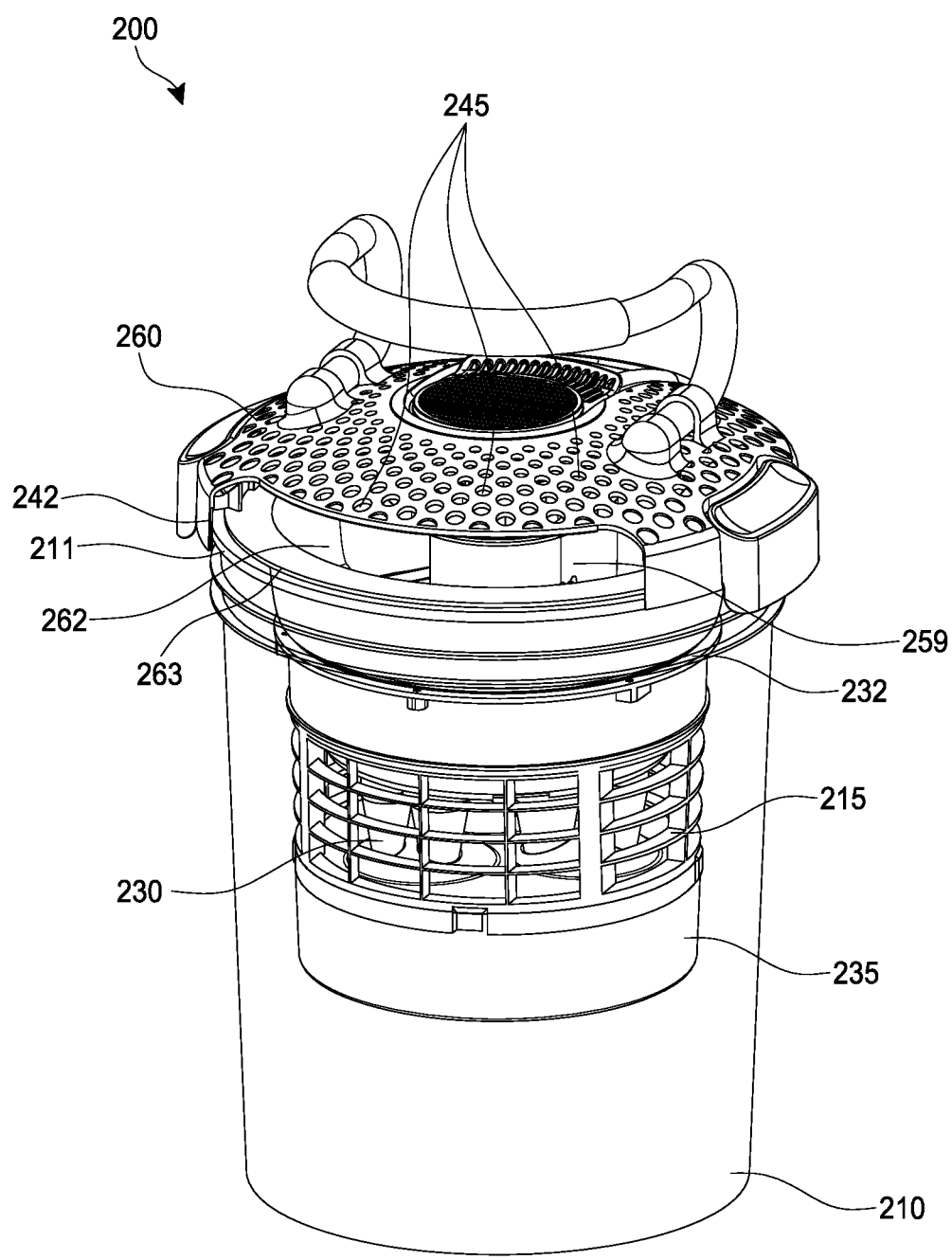
FIG. 2A is a perspective view of components of an example dust removal system in an operating configuration.
Figure 2B:
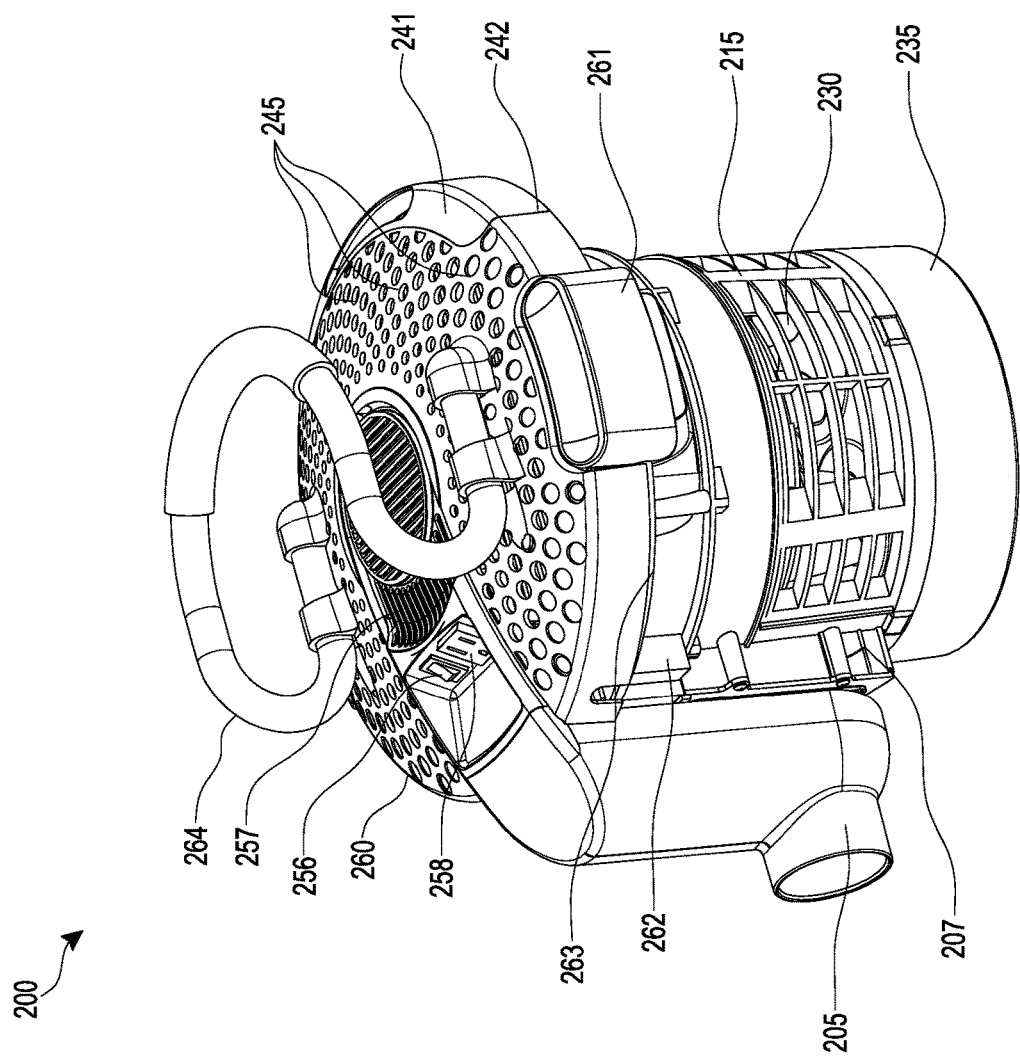
FIG. 2B is a perspective view of an example dust removal system in a portable configuration.
Figure 2C:
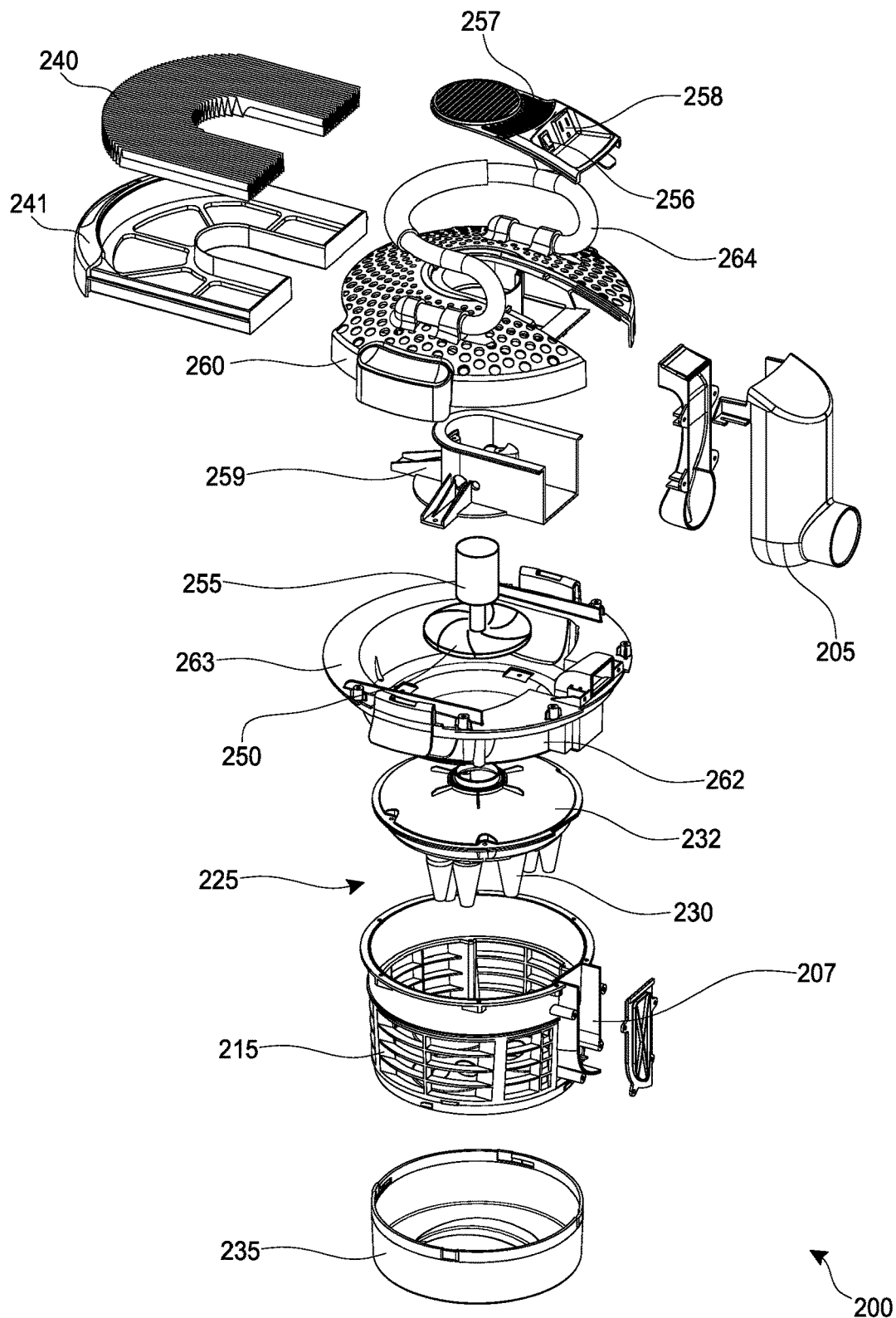
FIG. 2C is an exploded view of the example dust removal system of FIGS. 2A-2B.
Figure 2D:
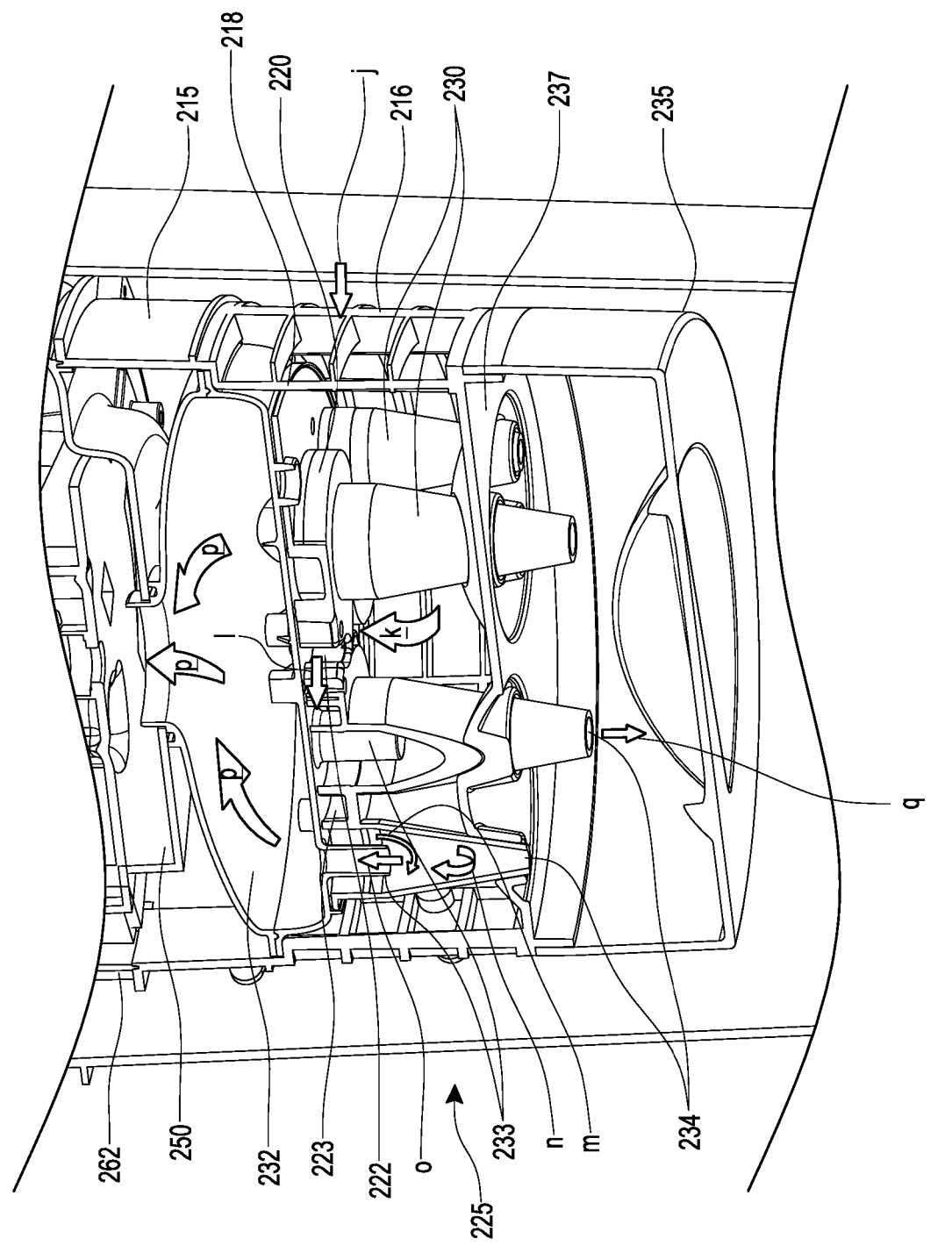
FIG. 2D is a cross sectional perspective view of the cyclone array assembly portion of the example dust removal system of FIGS. 2A-2C.

FIGS. 2A-2D depict an example dust removal system 200 consistent with the system 100 schematically depicted in FIGS. 1A-1E. The system 200 is depicted in FIG. 2A in an operating configuration coupled within an exterior vessel 210. The system 200 is depicted in a portable configuration for transport or storage in FIG. 2B, not coupled to an exterior vessel. The system 200 is depicted in an exploded view in FIG. 2C. FIG. 2D depicts a cross sectional perspective view of a portion of the system 200. Similar to the system 100 depicted in FIGS. 1A-1E, the dust removal system 200 of FIGS. 2A-2D includes an inlet 205, an array 225 of cyclonic separators 230 coupled to a cyclone inlet manifold 220 and disposed within a pre-filtration section 215. The system 200 further includes a cyclone exhaust chamber 232, a dust collection chamber 235, an impeller 250, a motor 255, an upper housing 260, and a removable filter stack 240. The upper housing 260 includes a cutaway 242 sized and shaped to accommodate a filter tray 241 holding the removable filter stack 240. As shown in FIG. 2A, the dust removal system 200, including the components present in FIGS. 2-2D, can be mounted to an exterior vessel 210. In the example embodiment of FIG. 2A, the exterior vessel 210 is a five-gallon bucket or pail commonly used in the construction industry. Thus, when not in use, the dust removal system 200 can be transported and/or stored independent of the exterior vessel 210, providing an advantageous reduction in size and weight, as shown in FIG. 2B.

The upper housing 260 is sized and shaped to accommodate the motor 255 in a central portion of the upper housing 260. The upper housing 260 is secured to a lower housing 262. A motor housing 259 secured to the lower housing 262 and/or the upper housing 260 at least partially surrounds the motor 255 between the upper housing 260 and the lower housing 262. A motor exhaust 257 allows cooling air from the motor 255 to leave the upper housing 260. A power switch 256 at an exterior surface of the upper housing 260 allows a user to turn the motor 255 on and off. The motor 255 can receive external electrical power through a power connector 258 at an exterior surface of the upper housing 260. In other embodiments, the motor 255 may be powered by one or more batteries.

The lower housing 262 further includes a circumferential support element 263, such as a lip, flange, or other protrusion. When the dust removal system 200 is mounted to an exterior vessel 210, the support element 263 rests on an upper rim 211 of the exterior vessel 210 as shown in FIG. 2A to suspend the dust removal system 200 such that the bottom of the dust collection chamber 235 remains spaced above the bottom of the exterior vessel 210. A plurality of exhaust holes 245 in the upper housing 260 permit filtered air to leave the dust removal system 200. The upper housing 260 and/or the lower housing 262 can further include a releasable clasp 261 or other securing means to fix the dust removal system 200 to the exterior vessel 210 when in use. A handle 264 is secured to the upper housing 260 for carrying and/or otherwise manipulating the dust removal system 200. As shown in FIGS. 2B and 2C, in some embodiments the primary inlet 205 assembly can be coupled to the upper housing 260, while some or all of the tangential portion 207 of the inlet 205 can be coupled to or a part of the structure of the pre-filtration section 215.

In the example dust removal system 200 shown in FIGS. 2A-2D, the pre-filtration section 215 includes a frame 216 and one or more semipermeable mesh regions 218. In one aspect, each mesh region 218 can be an individual piece of mesh or similar porous material disposed within an opening 218 of the frame 216. In other embodiments, larger pieces of mesh can be secured to the exterior or interior surface of the frame 216 such that each piece covers two or more openings 218 of the frame 216. The mesh regions 218 contain an array of openings to permit air and dust to pass through the mesh. The size of the openings can be determined based on a desired size of particles to be excluded. For example, in certain embodiments the size of the openings can be between 0.005 square inches and 0.05 square inches (between 0.032 square cm and 0.323 square cm), between 0.01 and 0.02 square inches (between 0.065 square cm and 0.129 square cm), or any other suitable range, such that particles larger than the size of the openings in the mesh will be unable to pass through the mesh regions 218. Instead, such larger particles carried by air traveling through the system 200 may contact an exterior surface of the mesh region 218 and fall away to the bottom of the exterior vessel 210. In addition, with reference to FIG. 2B, an exterior portion of the pre-filtration section 215 forms the tangential section 207 of the inlet 205, such that dust-laden air entering the system 200 is propelled into the space surrounding the pre-filtration section 215 along a path that will intersect the exterior vessel 210 of FIG. 2A.

FIG. 2D is a cross sectional perspective view of the cyclone assembly portion of the example dust removal system 200 of FIGS. 2A-2C, defined generally by the space within the pre-filtration section 215 and dust collection chamber 235. As shown in the cross sectional view of FIG. 2D, the pre-filtration section 215 surrounds the array 225 of cyclonic separators 230 coupled to the cyclone inlet manifold 220 and the cyclone exhaust chamber 232. The pre-filtration section 215 is coupled to the dust collection chamber 235 and the lower housing 262. A cyclone array base plate 237 defines the upper boundary of the dust collection chamber 235.

The cyclone inlet manifold 220 includes an inlet 222 and a plurality of channels 223. The inlet 222 is in fluid communication with the interior of each of the cyclonic separators 230 via the various channels 223 of the cyclone inlet manifold 220. In some embodiments, each channel 223 connects to a cyclonic separator 230 at or near the top of the cyclonic separator 230.

The cyclonic separators 230 are substantially conical and hollow. Each cyclonic separator 230 includes an upper outlet 233 and a lower outlet 234. The upper outlet 233 includes a hollow tube extending downward into the space within the cyclonic separator 230 to receive air at a point lower than the cyclone inlet manifold 220. The upper outlet 233 provides a fluid flow path between the interior of the cyclonic separator 230 and the cyclone exhaust chamber 232. The lower outlet 234 is an aperture located at the bottom of the conical section of the cyclonic separator 230. Each cyclonic separator 230 extends at least partially through the cyclone array base plate 237 such that particulate matter passing out of the cyclonic separator 230 through the lower outlet 234 falls through the cyclone array base plate 237 into the dust collection chamber 235. Extension of the cyclonic separators 230 through the cyclone array base plate 237 can further provide additional structural stability to the cyclone array 225 by anchoring the bottom of each cyclonic separator 230 in position.

As described above, airflow through the cyclone assembly portion of the dust removal system is driven by an impeller 250, which may be at least partially housed within the lower housing 262, or may be located within a separate impeller housing. The impeller 250 is in communication with, and configured to draw air from, the cyclone exhaust chamber 232, creating a negative pressure that causes air to travel along flow path j through the pre-filtration section 215, along flow path k into the cyclone inlet manifold 220, and along flow path 1 to the cyclonic separators 230. Air and dust within the pre-filtration section 215 enter the cyclone inlet manifold 220 along flow path k at the inlet 222. Within the cyclone inlet manifold 220, the channels 223 send a portion of the dust-laden air from the inlet 222 to each of the cyclonic separators 230. As described in greater detail below with reference to FIGS. 3B and 3C, the channels 223 of the cyclone inlet manifold 220 can be configured to direct relatively larger dust and dirt particles to the larger cyclonic separators 230, and to direct relatively smaller dust and dirt particles to the smaller cyclonic separators 230, to enhance the efficiency of cyclonic separation.

Dust-laden air enters each cyclonic separator 230 traveling along flow path m, substantially parallel or tangential to the inner wall of the cyclonic separator 230. The air and dust are then guided along a helical path to a lower portion of the separator 230 before traveling upward along flow path n through the center of the helical path, and out of the separator 230 through the upper outlet 233 along flow path o. Due to the conical shape of the separators 230, the helical path of the dust-laden air tends to have a decreasing radius as the air travels downward within one of the cyclonic separators 230. The relatively small and decreasing radius of the helical path causes at least a portion of the dust particles to collide with the interior surface of the cyclonic separator 230 due to inertia and/or centrifugal force, and fall to the bottom of the separator 230. At the bottom of the separator 230, the dust particles that have separated from the helical air stream can pass through the lower outlet 234 into the dust collection chamber 235. The somewhat less dust-laden air travels upward through the upper outlet 233 along flow path o to the cyclone exhaust chamber 232. The air is then pulled along flow path p into the impeller toward a final filtration stage.

Figure 2F:
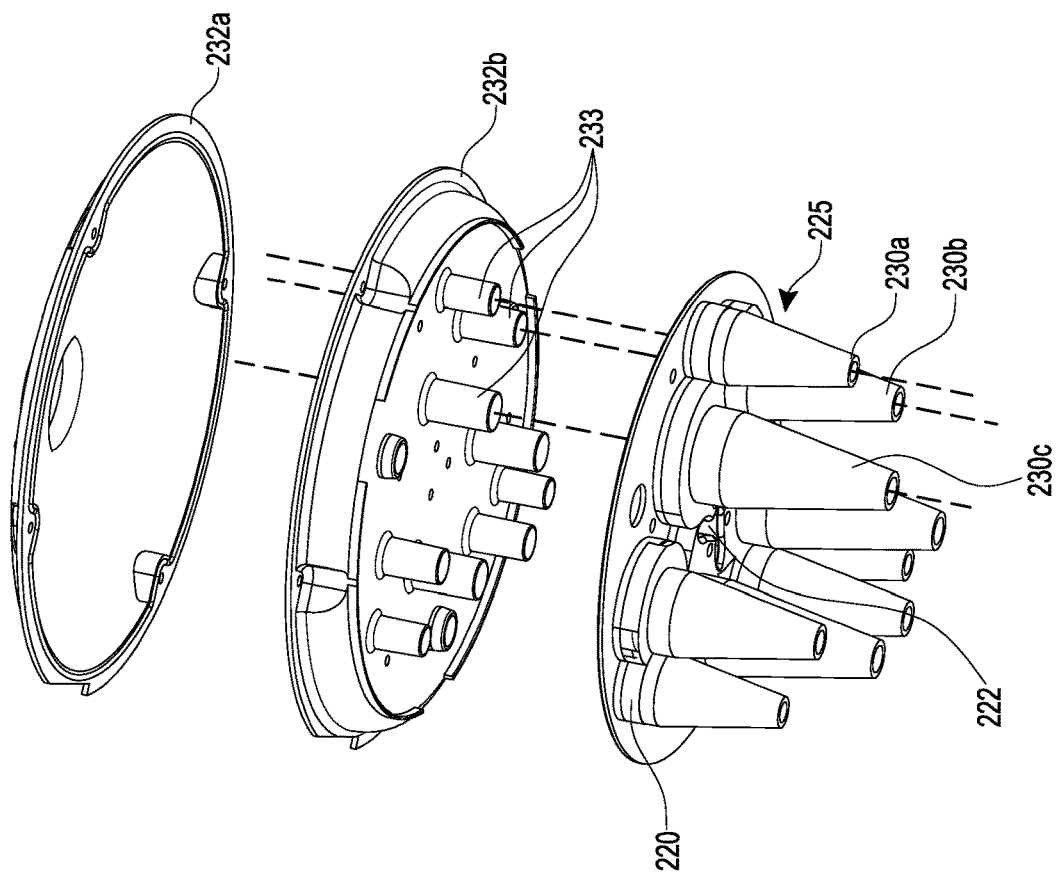
FIGS. 2F and 2G are exploded views of the cyclone array, manifold, and cyclone exhaust chamber depicted in FIG. 2E.
Figure 2E:
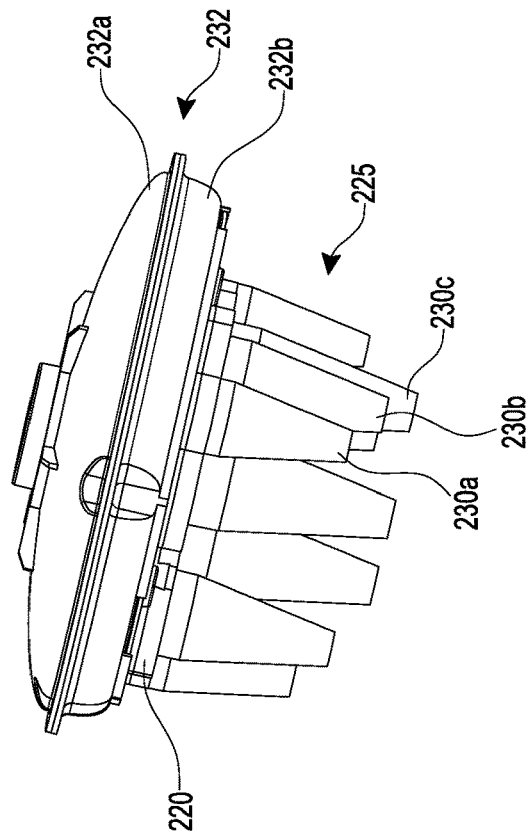
FIG. 2E is a perspective view of the cyclone array, manifold, and cyclone exhaust chamber of the dust removal system of FIGS. 2A-2D.
Figure 2G:
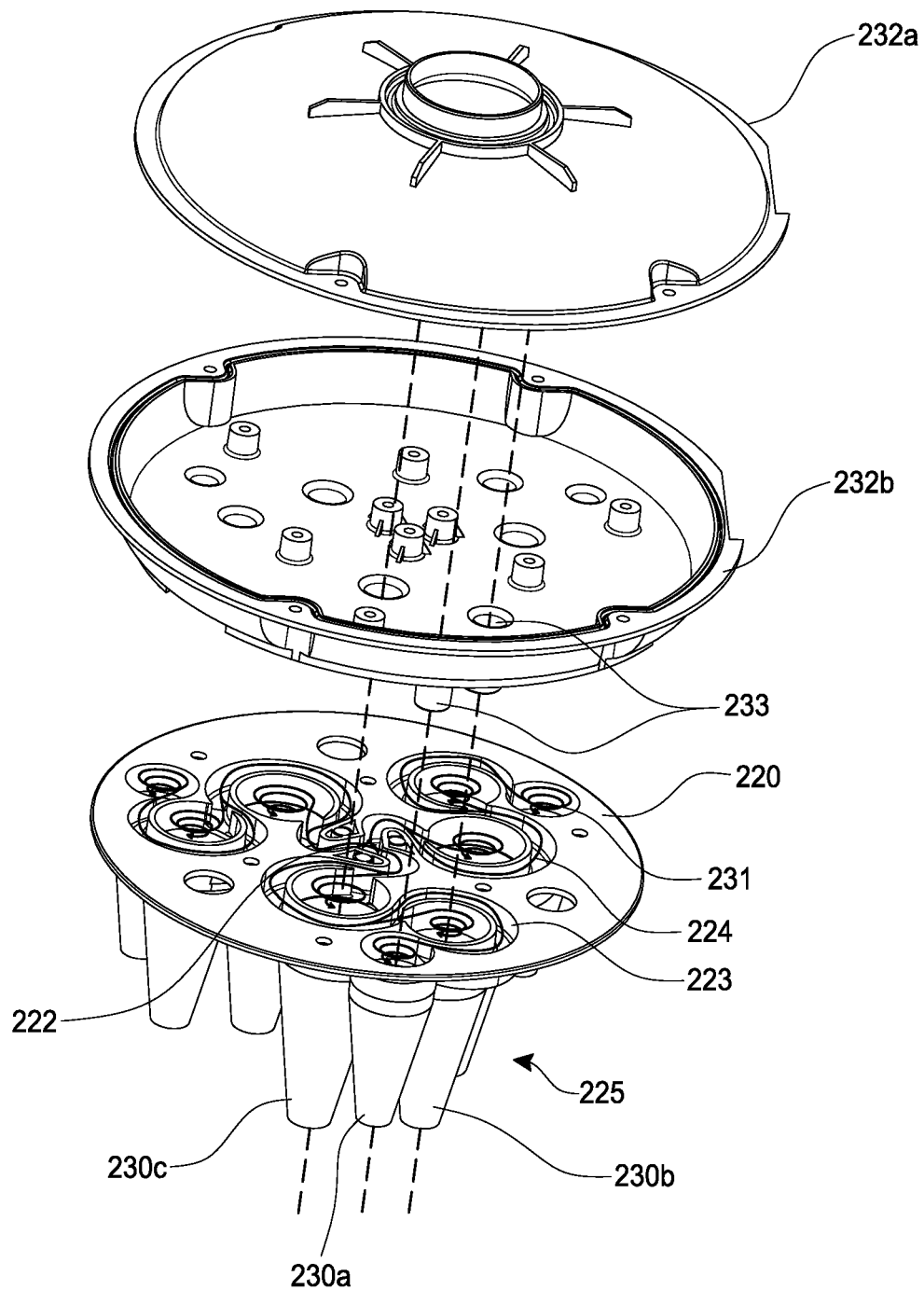

Referring now to FIGS. 2E-2G, an example cyclone chamber, including the portion of the cyclone assembly located within the pre-filtration section 215 of FIGS. 2A-2C, will be described in greater detail. The cyclone chamber is depicted as assembled in FIG. 2E, in a bottom perspective exploded view in FIG. 2F, and in a top perspective exploded view in FIG. 2G. The cyclone chamber includes a cyclone array 225 including cyclonic separators 230*a*, 230*b*, and 230*c*, as well as the cyclone inlet manifold 220 and the cyclone exhaust chamber 232. The cyclone exhaust chamber is formed by the coupling of an exhaust housing 232*a* and an exhaust base plate 232*b*.

As shown in FIGS. 2F and 2G, the cyclone inlet manifold 220 and cyclonic separators 230*a*, 230*b*, and 230*c* can be integrally formed as a single piece of material such as a plastic or the like. In other embodiments, the cyclonic separators 230a, 230b, and 230c can be manufactured separately from the cyclone inlet manifold 220 and coupled to the cyclone inlet manifold 220 during assembly of the cyclone chamber. Similarly, the exhaust base plate 232b can include upper outlets 233 as integrally formed parts of the exhaust base plate 232b.

The cyclone inlet manifold 220 includes an inlet 222 and one or more air channels 223 configured to direct dust-laden air from the inlet 222 to the cyclonic separators 230a, 230b, and 230c. After entering the cyclone inlet manifold 220 at the inlet 222, dust-laden air travels along flow path 224, guided by the contours of the air channels 223, to enter the cyclonic separators 230a, 230b, 230c. In some embodiments, a surface of the exhaust base plate 232b forms an upper wall of the air channels 223. Because the upper outlets 233 extend within each cyclonic separator 230a, 230b, 230c to a point lower than the point of entry from air channels 223, the dust-laden air entering each cyclonic separator 230a, 230b, 230c tends to travel in a descending helical flow path 231 bounded by the interior surface of the cyclonic separator 230a, 230b, 230c. The centrifugal force experienced by dust particles traveling within the helical flow path 231 causes at least a portion of the dust particles to drop out of the dust-laden air and fall to the bottom of the cyclonic separator 230a, 230b, 230c. At some point within the cyclonic separator 230a, 230b, 230c, the air leaves the helical flow path 231 and travels vertically through the upper outlet 233 and into the cyclone exhaust chamber 232 between the exhaust housing 232a and the exhaust base plate 232b.

Figure 3A:
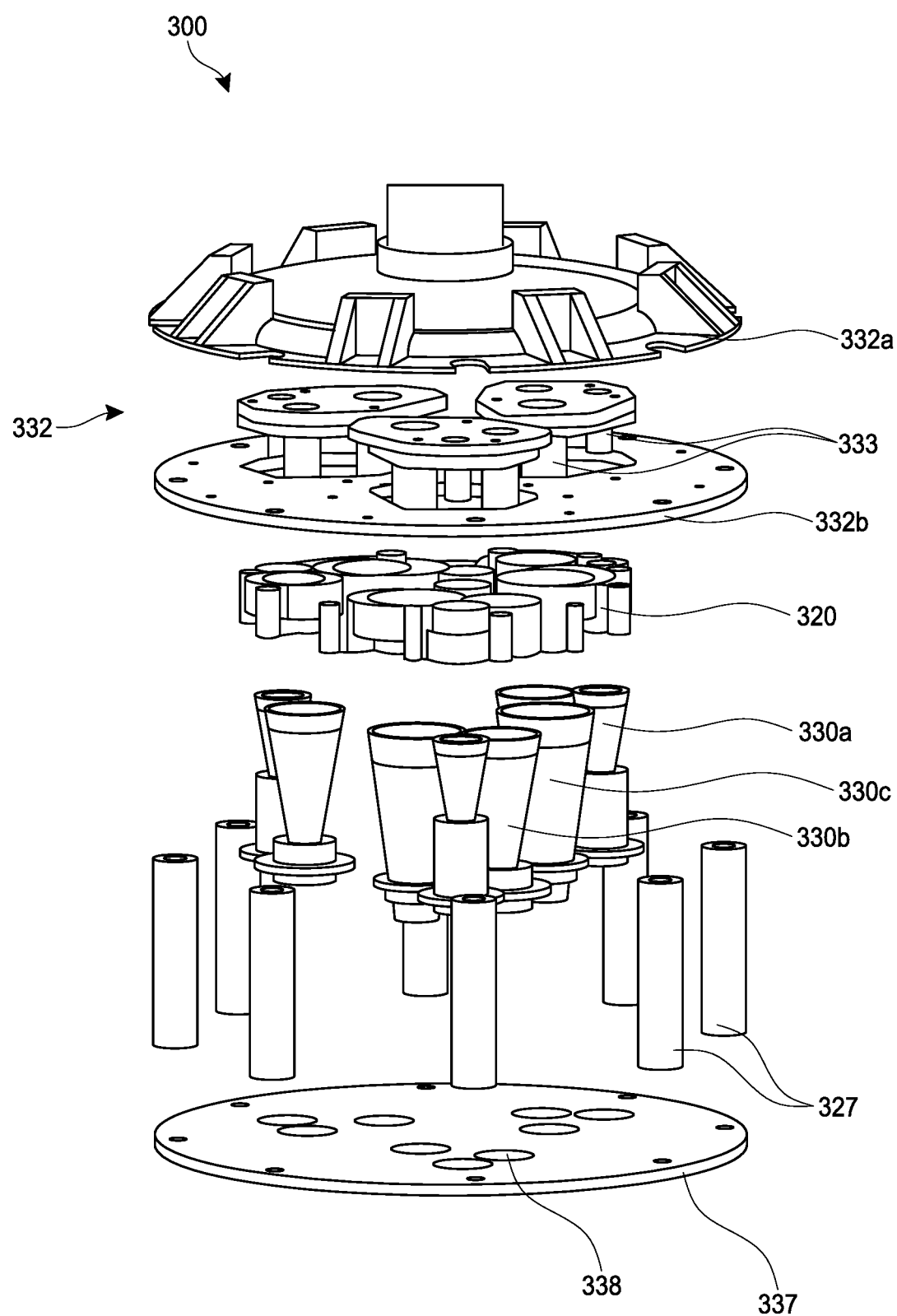
FIG. 3A is an exploded view of an example cyclone array assembly in accordance with an exemplary embodiment.
Figure 3B:
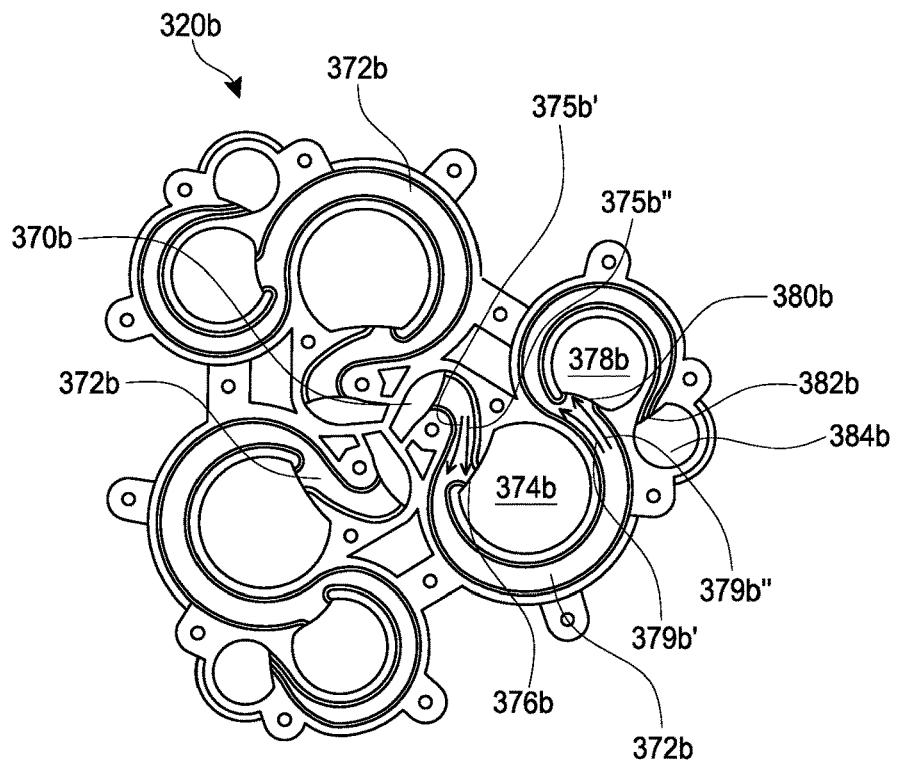
FIG. 3B is a top view of an example cyclone inlet manifold of the cyclone array assembly of FIG. 3A.
Figure 3C:
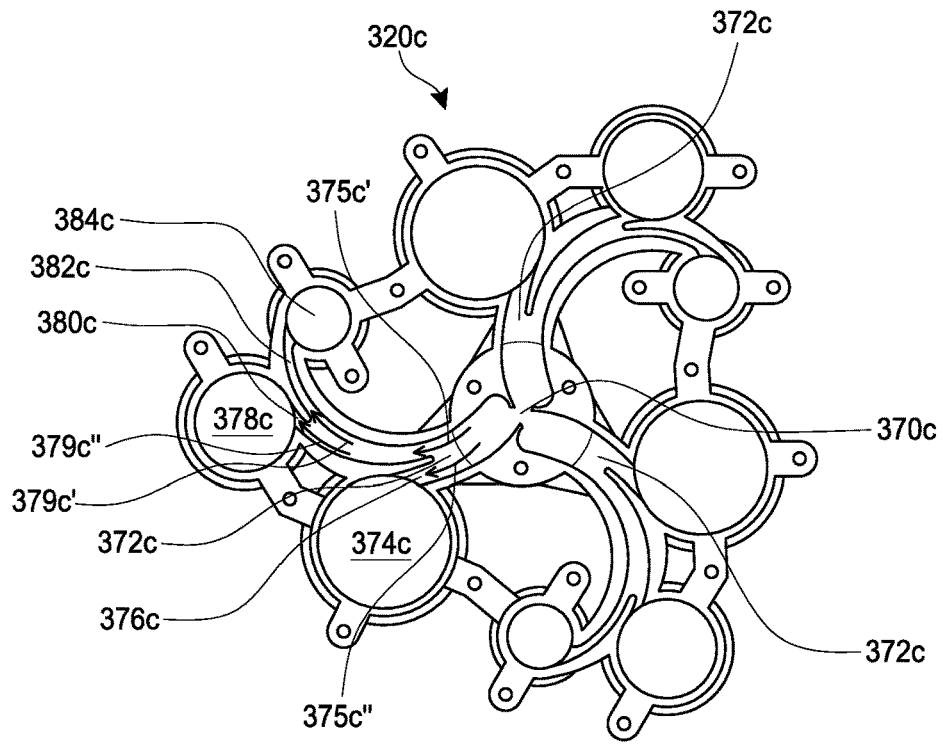
FIG. 3C is a top view of an alternative example cyclone inlet manifold of the cyclone array assembly of FIG. 3A.

Referring now to FIGS. 3A-3C, an alternative configuration of a cyclone array 300 will be described. The cyclone array 300 can be implemented within any of the embodiments of the dust removal system 100, 200 described herein. As shown in the exploded view of FIG. 3A, the cyclone array 300 includes a cyclone array base plate 337 including dust apertures 338, a plurality of cyclone array supports 327, small cyclonic separators 330a, mid-size cyclonic separators 330b, large cyclonic separators 330c, a cyclone inlet manifold 320, upper separator outlets 333, and a cyclone exhaust chamber 332 defined by the space between an exhaust housing 332a and an exhaust base plate 332b.

The cyclone array supports 327, cyclonic separators 330a, 330b, 330c and cyclone inlet manifold 320 are disposed within the space between the cyclone array base plate 337 and the exhaust base plate 332b. The cyclone array supports 327 are coupled to the cyclone array base plate 337 and the exhaust base plate 332b to maintain the appropriate spacing of the base plates 337, 332b and provide additional structural integrity and dimensional stability. The apertures 338 in the cyclone array base plate 337 allow separated dust to pass from the bottom of the cyclonic separators 330a, 330b, 330c through the cyclone array base plate 337 into a collection vessel below, such as the dust collection chambers 135, 235 of FIGS. 1D-2D. Similar to the upper outlets 233 of FIGS. 2D, 2F, and 2G, the upper separator outlets 333 extend downward into the space within each cyclonic separator 330a, 330b, 330c so as to create a helical air flow path to induce inertial separation of dust from the air stream within each cyclonic separator 330a, 330b, 330c.

Referring now to FIGS. 3B and 3C, example cyclone inlet manifolds 320b, 320c will be described in greater detail. Generally, the cyclone inlet manifolds 320b, 320c are configured receive air and dust at an inlet 370b, 370c and distribute the air and dust to the various cyclonic separators such that relatively larger dust particles are generally sent to larger cyclonic separators and relatively smaller dust particles are sent to smaller cyclonic separators. By generally sorting or separating the dust particles according to size, the cyclone inlet manifolds 320b, 320c can enhance efficiency of dust removal within the cyclonic separators. Cyclone inlet manifolds 320b and 320c, as well as the channel arrangements contained therein, may be incorporated into any of the dust removal systems 100, 200 described herein, for example, as cyclone inlet manifolds 120 or 220.

FIG. 3B depicts a top view of a cyclone inlet manifold 320b in a "spiral out" configuration. The cyclone inlet manifold 320b includes an inlet 370b and channels 372b for distributing dust-laden air from the inlet 370b to large cyclonic separators 374b, mid-size cyclonic separators 378b, and small cyclonic separators 384b. Each channel 372b includes a first separator interface 376b, a second separator interface 380b, and a third separator interface 382b. Dust-laden air entering the cyclone inlet manifold 320b at the inlet 370b is divided into three channels 372b. As air and dust travel outward from the inlet 370b through the channel 372b, a portion of the air and dust enter a large cyclonic separator 374b at the first separator interface 376b, while the remaining air and dust continue outward along the channel 372b. Similarly, a portion of the remaining air and dust enter a mid-size cyclonic separator 378b at the second separator interface 380b. The dust-laden air remaining in the channel 372b beyond the second separator interface 380b continues along the channel 372b until the channel 372b terminates at the third separator interface 382b, and enters the small cyclonic separator 384b.

The first and second separator interfaces 376b, 380b are disposed along curved portions of the channel 372b. More specifically, the first and second separator interfaces 376b, 380b are disposed along the outside of each curved portion such that relatively smaller dust particles can remain in the channel 372b, while relatively larger particles can be forced to the outside of the curved path and sent through the interface 376b, 380b due to their greater inertia. The radius of curvature of flow path 375b', which remains within the channel 372b at the first separator interface 376b, is smaller than the radius of curvature of flow path 375b", which passes through the first separator interface 376b. Similarly, the radius of curvature of flow path 379b', which remains within the channel 372b at the second separator interface 380b, is smaller than the radius of curvature of flow path 379b", which passes through the second separator interface 380b. Thus, the greater inertia of larger and heavier particles prevents those particles from traveling along paths 375b', 379b', which remain in the channel 372b. In addition, the radius of curvature of the channel 372b at the second separator interface 380b can be smaller than the radius of curvature of the channel 372b at the first separator interface 376b. Thus, a significant portion of the dust particles that were small enough to travel along path 375b', remaining in the channel 372b past the first separator interface 376b, may still be large enough to be sent out of the channel 372b along path 379b" at the second separator interface 380b. Thus, the large cyclonic separator 374b is disposed outside of the circle defined by the radius of curvature of the channel 372b at the branching point of the first separator interface 376b, the mid-size cyclonic separator 378b is disposed outside of the circle defined by the radius of curvature of the channel 372b at the second separator interface 380b, and the small cyclonic separator 384b can be disposed within the circle defined by the radius of curvature of the channel 372b at the third separator interface 382b.

FIG. 3C depicts a top view of an alternative cyclone inlet manifold 320c in a "whirlpool" configuration. Similar to the "spiral out" cyclone inlet manifold 320b of FIG. 3B, the "whirlpool" cyclone inlet manifold 320c uses channel curvature to roughly sort or separate dust particles based on particle size. Cyclone inlet manifold 320c includes an inlet 370c and three channels 372c for distributing dust-laden air from the inlet 370c to large cyclonic separators 374c, mid-size cyclonic separators 378c, and small cyclonic separators 384c. Each channel 372c includes a first branch 376c leading to a large cyclonic separator 374c, a second branch 380c leading to a mid-size cyclonic separator 378c, and a third branch 382c leading to a small cyclonic separator 384c.

As the first branch 376c splits from the channel 372c, the radius of curvature of flow path 375c" leading to the first branch 376c is larger than the radius of curvature of flow path 375c' leading to the remainder of the channel 372c. Thus, larger particles tend to travel along flow path 375c" through the first branch 376c to the large cyclonic separator 374c, while smaller particles are able to continue along flow path 375c' within the channel 372c. Similarly, flow path 379c" leading to the second branch 380c has a larger radius of curvature than flow path 379c' leading to the remainder of the channel 372c, such that some particles that had a small enough mass to travel along flow path 375c' and avoid the first branch 376c may be separated out from the main channel 372c along flow path 379c" into the second branch 380c and travel to the mid-size cyclonic separator 378c. The remaining air and dust travels along flow path 379c' through the third branch 382c to the small cyclonic separator 384c. Accordingly, the large cyclonic separator 374c is disposed outside of the circle defined by the radius of curvature of the channel 372c at the first branch 376c leading to the separator interface of the large cyclonic separator 374c, the mid-size cyclonic separator 378c is disposed outside of the circle defined by the radius of curvature of the second branch 380c at the separator interface of the mid-size cyclonic separator 378c, and the small cyclonic separator 384c can be disposed within the circle defined by the radius of curvature of the third branch 382c at the separator interface of the small cyclonic separator 384c. Thus, the cyclone inlet manifolds 320b, 320c can enhance the efficiency of the cyclone arrays described herein by roughly sorting the dust particles within the air by size so that particles tend to travel to the cyclonic separators with the highest efficiency for the particle size.

As described above with reference to FIG. 1D, the various dust removal systems described herein can be configured to received dust and air at a collector. In certain embodiments, the collector can be attachable to a dust-generating device such as a saw. FIGS. 4A-5C depict example configurations of dust collectors 400, 500 configured to attach to and collect dust generated by a circular saw so that the dust can be removed by any of the dust removal systems described herein.

The dust collector 400 depicted in FIGS. 4A-4C is sized and shaped to be coupled to an upper blade guard 405 of a first configuration consistent with the upper blade guard of a Makita 5007F circular saw or similarly shaped devices. The dust collector 400 may be made of any substantially rigid material, for example, a metal, a hard plastic, or the like. The dust collector 400 includes a blade guard connector 410 and a conduit connector 420 coupled by an intermediate section 430. The blade guard connector 410 is sized and shaped to fit around a portion of the upper blade guard 405 of the circular saw. Fastener apertures 414 are provided to accommodate mechanical fasteners for securing the dust collector 400 to the upper blade guard 405. For example, the mechanical fasteners may be set screws, and each fastener aperture 414 may have a threaded interior surface to receive and secure a screw.

The conduit connector 420 is sized and shaped to receive a suitable conduit for carrying air and dust from the dust collector 400 to a dust removal system such as dust removal systems 100, 200 described elsewhere herein. For example, the conduit may be the conduit 165 described with reference to FIG. 1D above. An opening 412 within the dust collector 400 allows dust created by the circular saw and ejected from the blade guard 405 to pass from the blade guard connector 410, through the intermediate section 430, to the conduit connector 420, where the dust can be pulled away from the dust collector 400 by a negative pressure within the connected dust removal system.

Figure 5C:
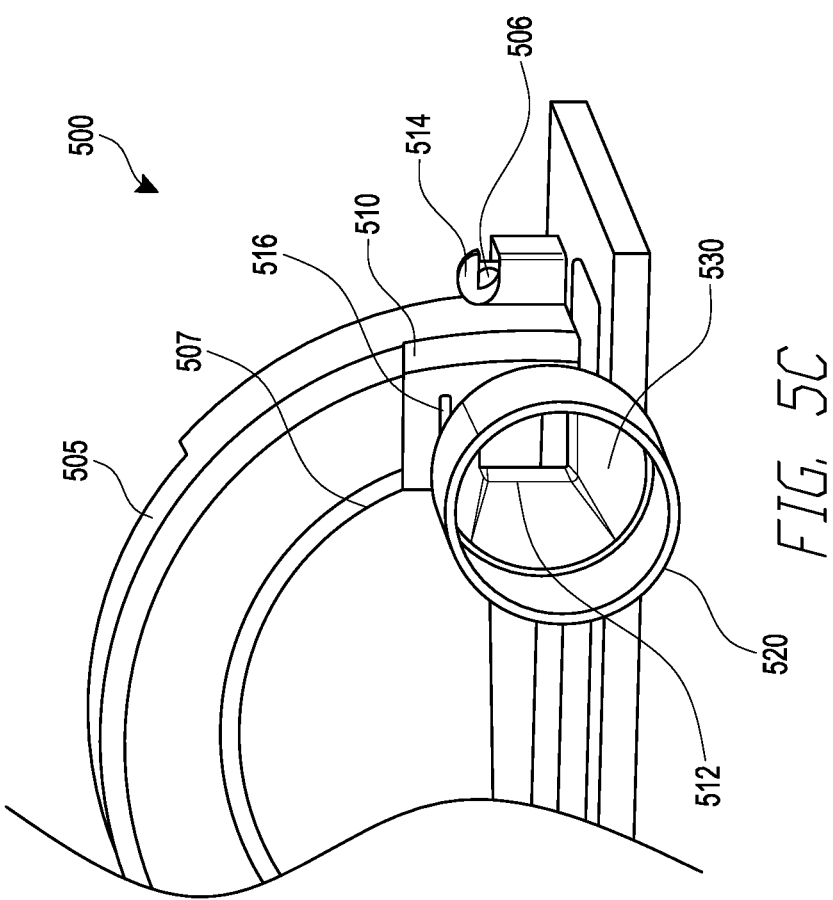
FIG. 5C depicts the dust collector of FIGS. 5A and 5B coupled to a circular saw.
Figure 5A:
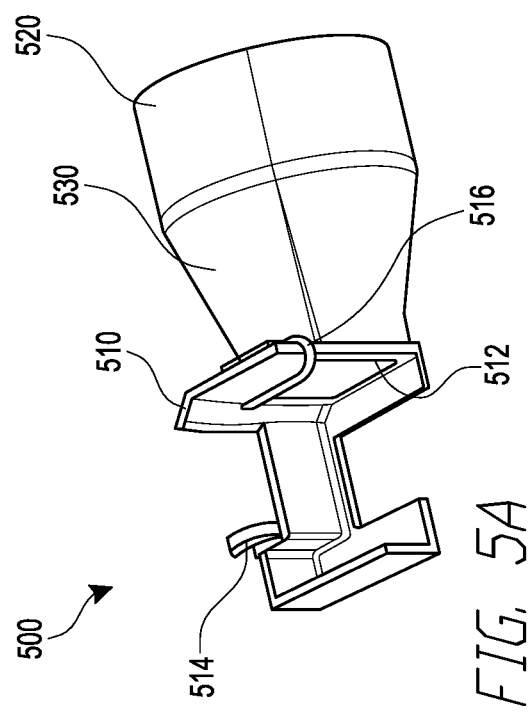
FIGS. 5A and 5B are perspective views of an example dust collector configured to collect dust generated by a circular saw.
Figure 5B:
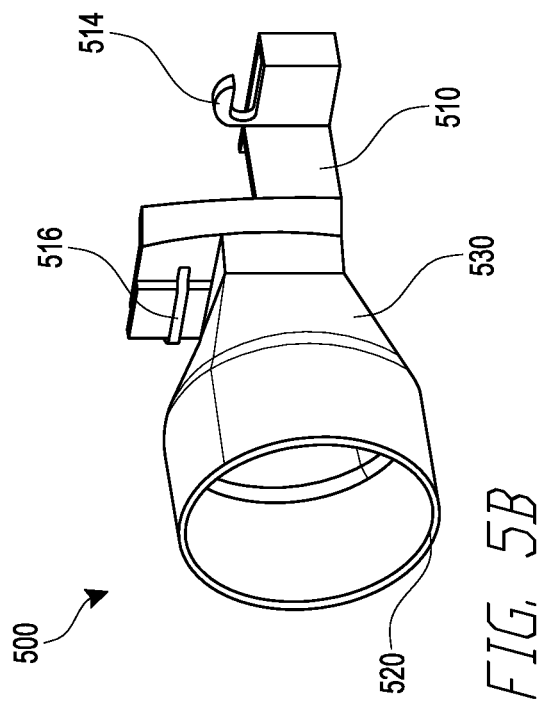

The dust collector 500 depicted in FIGS. 5A-5C is sized and shaped to be coupled to an upper blade guard 505 of a second configuration consistent with the upper blade guard of a SKILSAW circular saw or similarly shaped device. Similar to the dust collector 400 depicted in FIGS. 4A-4C, the dust collector 500 can be made of any substantially rigid material such as a metal, a hard plastic, or the like. The dust collector 500 includes a blade guard connector 510 and a conduit connector 520 coupled by an intermediate section 530. The blade guard connector 510 is sized and shaped to fit around a portion of the upper blade guard 505 of the circular saw. When used with circular saws having a mechanical fastener aperture 506, a retention arm 514 is provided to secure the dust collector 500 to the blade guard 505 using an existing mechanical fastener, such as a screw. A spring clip 516 is additionally provided to further secure the dust collector 500 to an inside edge 507 of the blade guard 505.

The conduit connector 520 is sized and shaped to receive a suitable conduit for carrying air and dust from the dust collector 500 to a dust removal system such as dust removal systems 100, 200 described elsewhere herein. For example, the conduit may be the conduit 165 described with reference to FIG. 1D above. An opening 512 within the dust collector 500 allows dust created by the circular saw and ejected from the blade guard 505 to pass from the blade guard connector 510, through the intermediate section 530, to the conduit connector 520, where the dust can be pulled away from the dust collector 500 by a negative pressure within the connected dust removal system.

Figure 6:
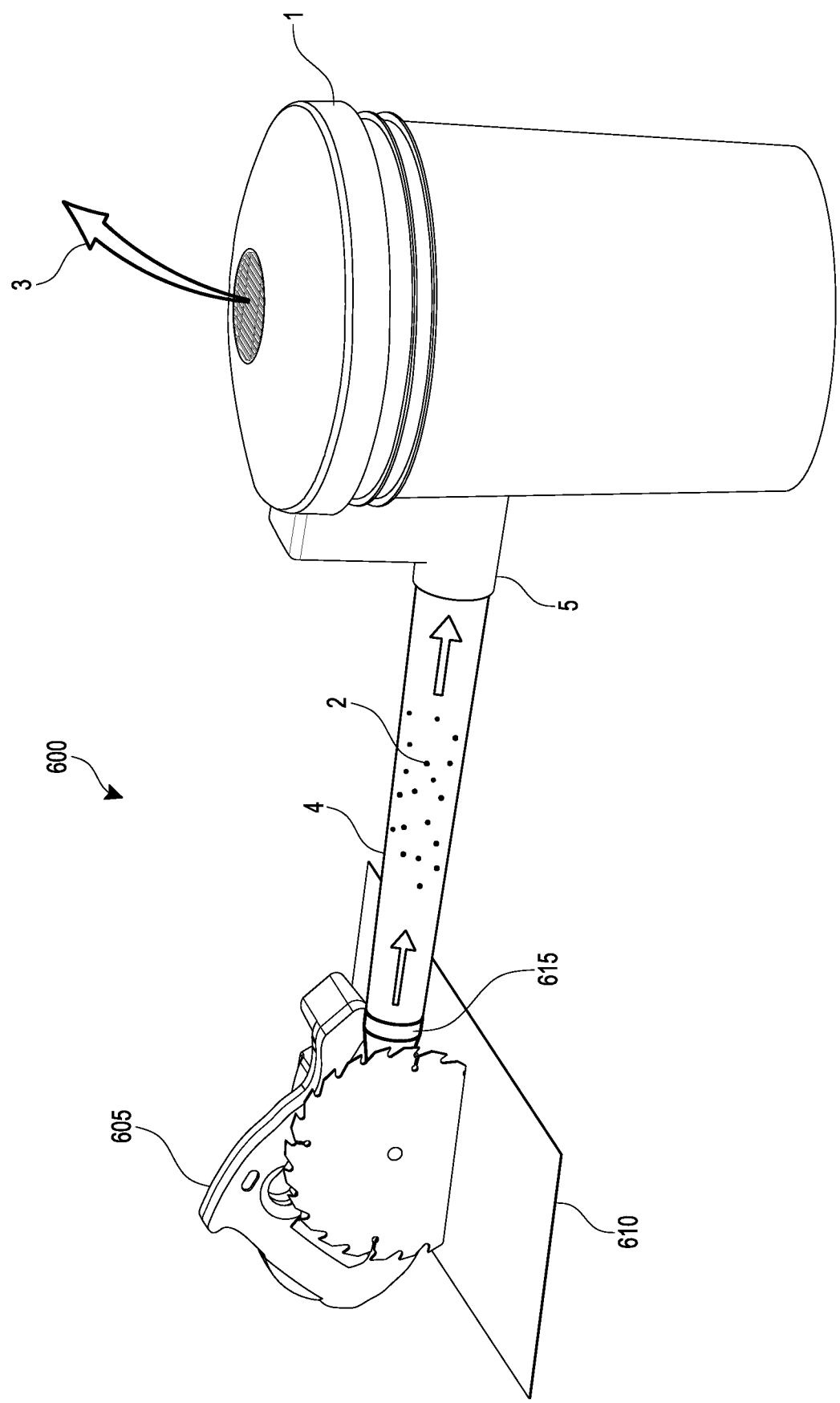
FIG. 6 schematically depicts a dust removal apparatus configured to remove dust from a cutting tool.

FIG. 6 schematically depicts a dust removal apparatus 600 configured to remove dust from dust-laden air generated by a cutting tool 605, such as a saw. As described elsewhere herein, the cutting of various construction materials 610, such as fiber cement materials, vinyl materials, or the like, may create a large amount of dust 2 which can be undesirable if collected in large quantities. Thus, the apparatus 600 depicted in FIG. 6 includes a dust collector 615 configured to couple to the cutting tool 605 and a dust removal system 1 configured to remove dust 2 from dust-laden air. The dust removal system 1 can be any of the dust removal systems 1, 100, 200 described herein. The dust collector 615 can be any suitable dust collector such as the dust collectors 400, 500 described herein. A conduit 4 connects the dust collector 615 to an inlet 5 of the dust removal system 1 to create a fluid flow path for the dust-laden air.

A pump within the dust removal system 1, such as an impeller or the like, creates a negative pressure within the dust removal system 1 which draws air, along with the dust 2 generated by the cutting tool, into the dust collector 615. The negative pressure in the dust removal system 1 pulls the air and dust 2 through the conduit 4 to enter the dust removal system 1 at the inlet 5. Using the components and functionality described herein with reference to FIGS. 1A-3C, the dust removal system 1 removes a significant portion of the dust 2 from the dust laden air and outputs cleaned air 3 to the environment.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Although making and using various embodiments are discussed in detail below, it should be appreciated that the description provides many inventive concepts that may be embodied in a wide variety of contexts. The specific aspects and embodiments discussed herein are merely illustrative of ways to make and use the systems and methods disclosed herein and do not limit the scope of the disclosure. Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A dust removal device comprising:
    a housing configured to couple with and cover an upper rim of a substantially rigid receptacle to form an enclosed interior space within the receptacle;
    an inlet at least partially disposed within the housing, the inlet configured to receive dust-laden air from outside the interior space and direct the dust-laden air into the interior space;
    a cyclone array coupled to the housing and configured to remove dust from the dust-laden air, the cyclone array comprising:
        a first cyclonic separator defined by a substantially conical shape having a circular cross section of a first maximum diameter;
        a second cyclonic separator defined by a substantially conical shape having a circular cross section of a second maximum diameter smaller than the first maximum diameter;
        a third cyclonic separator defined by a substantially conical shape having a circular cross section of a third maximum diameter smaller than the second maximum diameter; and
        a manifold coupled to the first second, and third cyclonic separators, the manifold comprising a manifold inlet configured to receive the dust-laden air from the interior space, and a plurality of flow channels disposed radially about the manifold inlet to divide the dust-laden air among the plurality of flow channels, each flow channel comprising:
            a first air channel defining a curvilinear air flow path between the manifold inlet and a first entry interface of the first cyclonic separator,
            a second air channel diverging from the first air channel at a first branching point spaced between the manifold inlet and the first cyclonic separator, the second air channel defining a curvilinear air flow path between the first branching point and a second entry interface of the second cyclonic separator, and
            a third air channel diverging from the second air channel at a second branching point spaced between the first branching point and the second cyclonic separator, the third air channel defining a curvilinear air flow path between the second branching point and a third entry interface of the third cyclonic separator;
        wherein the first air channel has a first radius of curvature at the first branching point, and the second air channel has a second radius of curvature at the first branching point, the second radius of curvature being smaller than the first radius of curvature; and
        wherein the first cyclonic separator is disposed outside of a circle defined by the first radius of curvature at the first branching point, the second cyclonic separator is disposed outside of a circle defined by a third radius of curvature of the second air channel at the second entry interface, and the third cyclonic separator is disposed within a circle defined by a fourth radius of curvature of the third air channel at the third entry interface a mesh screen configured to remove at least a portion of dust particles from dust-laden air traveling from the inlet to the cyclone array;

a pump configured to drive air through the dust removal system; and at least one air filter disposed within the housing, the air filter configured to receive air that has passed through at least one cyclonic separator of the cyclone array, wherein the dust removal device can be interchangeably coupled to a plurality of substantially rigid receptacles.

2. The dust removal device of claim 1, wherein the inlet further comprises a tangential section, said tangential section configured to induce an initial cyclonic separation of dust by directing the dust-laden air toward an interior wall of the receptacle.

3. The dust removal device of claim 1, further comprising a dust collection chamber removably secured to the dust separation device and configured to receive dust separated from the dust-laden air at the cyclone array.

4. The dust removal device of claim 1, wherein the pump comprises an impeller disposed downstream from the cyclone array.

5. The dust removal device of claim 1, wherein the mesh screen comprises an array of openings having an area between 0.005 square inches and 0.02 square inches.

6. A dust removal system comprising:

a first separation stage configured to remove a first portion of dust particles from a volume of dust-laden air by inertial separation;

a second separation stage configured to remove a second portion of dust particles relatively smaller than the particles of the first portion of dust particles from the volume of dust-laden air, the second separation state comprising:

a first cyclonic separator defined by a substantially conical shape having a circular cross section of a first maximum diameter;

a second cyclonic separator defined by a substantially conical shape having a circular cross section of a second maximum diameter smaller than the first maximum diameter;

a third cyclonic separator defined by a substantially conical shape having a circular cross section of a third maximum diameter smaller than the second maximum diameter; and a manifold comprising:

an inlet configured to receive a flow of dust-laden air; and a plurality of flow channels disposed radially about the inlet to divide the flow of dust-laden air among the plurality of flow channels, each flow channel comprising:

a first air channel defining a curvilinear air flow path between the inlet and a first entry interface of the first cyclonic separator;

a second air channel diverging from the first air channel at a first branching point spaced between the inlet and the first cyclonic separator, the second air channel defining a curvilinear air flow path between the first branching point and a second entry interface of the second cyclonic separator; and a third air channel diverging from the second air channel at a second branching point spaced between the first branching point and the second cyclonic separator, the third air channel defining a curvilinear air flow path between the second branching point and a third entry interface of the third cyclonic separator;

wherein the first air channel has a first radius of curvature at the first branching point, and the second air channel has a second radius of curvature at the first branching point, the second radius of curvature being smaller than the first radius of curvature; and wherein the first cyclonic separator is disposed outside of a circle defined by the first radius of curvature at the first branching point, the second cyclonic separator is disposed outside of a circle defined by a third radius of curvature of the second air channel at the second entry interface, and the third cyclonic separator is disposed within a circle defined by a fourth radius of curvature of the third air channel at the third entry interface; and a third separation stage comprising an air filter configured to remove a third portion of dust particles relatively smaller than the particles of the second portion of dust particles from the volume of dust-laden air.

7. The dust removal system of claim 6, wherein the first separation stage comprises an inner surface of a substantially rigid receptacle.

8. The dust removal system of claim 6, further comprising a pre-filtration stage between the first separation stage and the second separation stage.

9. The dust removal system of claim 8, wherein the pre-filtration stage comprises a mesh screen, the mesh screen located within the dust removal system such that substantially all air traveling from the first separation stage to the second separation stage passes through the mesh screen.

10. The dust removal system of claim 8, wherein the pre-filtration stage, the second separation stage, and the third separation stage comprise a dust removal device removably coupleable to the first separation stage.

11. The dust removal system of claim 6, wherein each of the cyclonic separators has a circular cross section with a maximum diameter, and wherein at least two of the cyclonic separators have different maximum diameters.

12. The dust removal system of claim 11, wherein the second separation stage is configured to distribute the dust-laden air among the cyclonic separators based at least in part on the size of dust particles within the dust-laden air.

13. The dust removal system of claim 6, further comprising a collection stage, the collection stage comprising a conduit in fluid communication with the first separation stage and a dust collector in fluid communication with the conduit, the dust collector coupleable to a dust-producing device to receive dust produced by the dust-producing device.

14. A cyclone array for removing dust from dust-laden air, the cyclone array comprising:

a first cyclonic separator defined by a substantially conical shape having a circular cross section of a first maximum diameter;

a second cyclonic separator defined by a substantially conical shape having a circular cross section of a second maximum diameter smaller than the first maximum diameter;

a third cyclonic separator defined by a substantially conical shape having a circular cross section of a third maximum diameter smaller than the second maximum diameter; and a manifold comprising:

an inlet configured to receive a flow of dust-laden air; and a plurality of flow channels disposed radially about the inlet to divide the flow of dust-laden air among the plurality of flow channels, each flow channel comprising:

a first air channel defining a curvilinear air flow path between the inlet and a first entry interface of the first cyclonic separator;

a second air channel diverging from the first air channel at a first branching point spaced between the inlet and the first cyclonic separator, the second air channel defining a curvilinear air flow path between the first branching point and a second entry interface of the second cyclonic separator; and a third air channel diverging from the second air channel at a second branching point spaced between the first branching point and the second cyclonic separator, the third air channel defining a curvilinear air flow path between the second branching point and a third entry interface of the third cyclonic separator;

wherein the first air channel has a first radius of curvature at the first branching point, and the second air channel has a second radius of curvature at the first branching point, the second radius of curvature being smaller than the first radius of curvature, and wherein the first cyclonic separator is disposed outside of a circle defined by the first radius of curvature at the first branching point, the second cyclonic separator is disposed outside of a circle defined by a third radius of curvature of the second air channel at the second entry interface, and the third cyclonic separator is disposed within a circle defined by a fourth radius of curvature of the third air channel at the third entry interface.

15. The cyclone array of claim 14, wherein a first dust removal path comprises the first and second air channels and the first and second cyclonic separators, the cyclone array further comprising a second dust removal path in parallel with the first dust removal path, the second dust removal path comprising:

a third cyclonic separator defined by a substantially conical shape having a circular cross section of the first maximum diameter; and a fourth cyclonic separator defined by a substantially conical shape having a circular cross section of the second maximum diameter;

wherein the manifold further comprises:

a third air channel defining a curvilinear air flow path between the inlet and the third cyclonic separator, such that the first air channel and the third air channel each receive a portion of the dust-laden air entering the manifold at the inlet; and a fourth air channel diverging from the third air channel at a second branching point spaced between the inlet and the third cyclonic separator, the fourth air channel defining a curvilinear air flow path between the second branching point and the fourth cyclonic separator; and wherein the third air channel has the first radius of curvature at the second branching point, and the fourth air channel has the second radius of curvature at the second branching point.

16. The cyclone array of claim 14, further comprising a cyclone exhaust chamber disposed at an upper portion of the cyclone array, the cyclone exhaust chamber in fluid communication with the first cyclonic separator, the second cyclonic separator, and an impeller configured to cause air to flow through the cyclone array.

17. The cyclone array of claim 14, further comprising a dust collection chamber configured to receive particles removed from the dust-laden air within the first cyclonic separator and the second cyclonic separator.

* * * * *